United States Patent
Simard-Bilodeau et al.

(10) Patent No.: US 10,845,471 B2
(45) Date of Patent: Nov. 24, 2020

(54) EXTRINSIC STATIC NOISE CHARACTERIZATION AND REMOVAL

(71) Applicant: LEDDARTECH INC., Quebec (CA)

(72) Inventors: Vincent Simard-Bilodeau, Quebec (CA); Samuel Gidel, Quebec (CA)

(73) Assignee: LEDDARTECH INC., Québec (CA)

( * ) Notice: Subject to any disclaimer, the term of this patent is extended or adjusted under 35 U.S.C. 154(b) by 296 days.

(21) Appl. No.: 16/066,403

(22) PCT Filed: Dec. 23, 2016

(86) PCT No.: PCT/IB2016/057985
§ 371 (c)(1),
(2) Date: Jun. 27, 2018

(87) PCT Pub. No.: WO2017/115258
PCT Pub. Date: Jul. 6, 2017

(65) Prior Publication Data
US 2019/0004158 A1    Jan. 3, 2019

Related U.S. Application Data

(60) Provisional application No. 62/271,727, filed on Dec. 28, 2015.

(51) Int. Cl.
*G01S 7/497* (2006.01)
*G01C 3/08* (2006.01)
(Continued)

(52) U.S. Cl.
CPC ............... *G01S 7/497* (2013.01); *G01C 3/08* (2013.01); *G01S 7/4876* (2013.01);
(Continued)

(58) Field of Classification Search
CPC ........ G01S 17/04; G01S 17/10; G01S 7/4913; G01S 7/4876; G01S 3/08; G01S 7/497
(Continued)

(56) References Cited

U.S. PATENT DOCUMENTS 7,640,122 B2 * 12/2009 Levesque ................ G01S 7/484
250/559.38
2012/0154786 A1    6/2012  Gosch
2015/0124241 A1    5/2015  Eisele

* cited by examiner

*Primary Examiner* — Daniel L Murphy
(74) *Attorney, Agent, or Firm* — Blueshift IP, LLC; Robert Plotkin

(57) ABSTRACT

Computer-implemented methods and systems for at least partially removing extrinsic static noise from data obtained by an optical time-of-flight sensor using full-waveform analysis. The method comprises finding a mathematical representation of the electromagnetic crosstalk present in victim calibration traces and caused by aggressor photosensitive element using aggressor calibration traces and victim calibration traces, determining a predetermined threshold for the amplitude of the aggressor calibration trace at which the electromagnetic crosstalk is present in the victim calibration traces, predicting the extrinsic static noise generated by the aggressor signal on the synchronized victim operation trace using the mathematical representation to generate a predicted crosstalk signal, removing the predicted crosstalk signal from the synchronized victim operation trace to output a denoised signal. The system comprises an identification and parameter estimation unit, a peak detection unit and a crosstalk prediction unit. An optional saturated summit completion unit can be provided.

17 Claims, 15 Drawing Sheets

(51) Int. Cl.
    *G01S 17/10*     (2020.01)
    *G01S 7/487*     (2006.01)
    *G01S 17/04*     (2020.01)
    *G01S 7/4913*     (2020.01)

(52) U.S. Cl.
    CPC ............ *G01S 7/4913* (2013.01); *G01S 17/04* (2020.01); *G01S 17/10* (2013.01)

(58) Field of Classification Search
    USPC ....................................................... 356/4.01
    See application file for complete search history.

EXTRINSIC STATIC NOISE CHARACTERIZATION AND REMOVAL

TECHNICAL FIELD

The present invention relates to the field of extrinsic static noise characterization and removal, more particularly in the context of time-of-flight sensors using full-waveform signals.

BACKGROUND OF THE ART

Prior art optical range-finding sensors comprise a light source adapted to emit light pulses of short duration. Each emitted light pulse that is backscattered by the objects in the environment of the sensor is captured by a sensor comprising one or an array of photodiodes. The signal generated by each photodiode is amplified and digitalized, resulting in a numerical signal. Each sample of the numerical signal corresponds to the intensity of the backscattered light at a specific time. This numerical signal is often called full-waveform signal or trace. Knowing the speed of light and the point in time at which the light pulse has been emitted, it is possible to relate each sample of the trace to a distance. The intensity peaks present in the trace correspond to objects in the scene and the positions of the intensity peaks in the trace correspond to the distances between the sensor and the objects.

Crosstalk reduction in optical time-of-flight systems is crucial for obtaining accurate measurements. In such systems, crosstalk may be caused by electrical or optical issues. Electrical crosstalk is usually caused by an undesirable Electro-Magnetic Field (EMF) generated by one or more aggressor source contaminating the signal of one or more victim photodiode victim. Optical crosstalk is usually caused by the effects of undesirable refraction and/or reflection of the light emitted by the optical range-finding sensor on the photodiode elements.

Some approaches have been attempted to reduce the crosstalk effect using hardware methods such as electrical isolation techniques (shielding) and/or circuit configurations (such as component placement that minimizes the crosstalk). However, electrical isolation is usually complex to implement due to numerous factors such as the characteristics of the photodiode or the signal frequency. Others approaches propose minimizing the crosstalk by software methods based on digitalization of the photodiode signal. These approaches leave a non-negligible amount of noise in the outputted signals.

Therefore, there is a need for a method and system for characterizing and/or attenuating/removing crosstalk for time-of-flight sensors using full-waveform analysis.

SUMMARY

Computer implemented methods and systems are described herein for at least partially removing extrinsic static noise for a time-of-flight optical sensor using full-waveform analysis. The extrinsic static noise is caused by the light backscattered by the object in the scene. Extrinsic static noise can significantly degrade the distance measurement accuracy of the sensor.

In the embodiments described herein, the time-of-flight optical sensor has a plurality of synchronized photosensitive elements, at least some are positioned in proximity thereby allowing electromagnetic crosstalk caused by an aggressor photosensitive element to affect at least one victim photosensitive element.

According to one broad aspect of the present invention, computer-implemented methods and systems are provided for at least partially removing extrinsic static noise from data obtained by an optical time-of-flight sensor using full-waveform analysis. The method comprises finding a mathematical representation of the electromagnetic crosstalk present in victim calibration traces and caused by aggressor photosensitive element using aggressor calibration traces and victim calibration traces, determining a predetermined threshold for the amplitude of the aggressor calibration trace at which the electromagnetic crosstalk is present in the victim calibration traces, predicting the extrinsic static noise generated by the aggressor signal on the synchronized victim operation trace using the mathematical representation to generate a predicted crosstalk signal, removing the predicted crosstalk signal from the synchronized victim operation trace to output a denoised signal. The system comprises an identification and parameter estimation unit, a peak detection unit and a crosstalk prediction unit. An optional saturated summit completion unit can be provided.

According to another broad aspect of the present invention, there is provided a computer-implemented method for at least partially removing extrinsic static noise from full-waveform data obtained using an optical time-of-flight sensor. The method includes the following steps:

Receiving a plurality of aggressor calibration traces from the aggressor photosensitive element and a plurality of victim calibration traces from at least one victim photosensitive element. The aggressor calibration traces and the victim calibration traces are obtained in a controlled environment wherein an amplitude of a calibration peak of the aggressor calibration traces is varied and no object is present in a field-of-view of the victim photosensitive element(s).

Finding a mathematical representation of the electromagnetic crosstalk present in the plurality of victim calibration traces for each victim photosensitive element using the aggressor calibration traces and the victim calibration traces.

Determining a predetermined threshold for each victim photosensitive element using the aggressor calibration traces and the victim calibration traces. The predetermined threshold corresponds to a minimum amplitude of the calibration peak of the aggressor calibration traces at which the electromagnetic crosstalk is present in the plurality of victim calibration traces.

Receiving an operation trace from the aggressor photosensitive element. The operation trace is obtained in an uncontrolled environment wherein a shape of a detection peak of the operation trace is determined by a presence of an object in a field-of-view of the optical time-of-flight sensor during normal operation, the shape including an amplitude and a location of the detection peak.

Comparing the amplitude of the detection peak of the operation trace to the predetermined threshold and identifying the operation trace as being an aggressor signal created by the aggressor photosensitive element if the amplitude of the detection peak is greater than the predetermined threshold.

Receiving at least one synchronized victim operation trace from the victim photosensitive element.

Predicting the extrinsic static noise generated by the aggressor signal on the synchronized victim operation trace using the mathematical representation for each victim photosensitive element to generate a predicted crosstalk signal.

Removing the predicted crosstalk signal from the synchronized victim operation trace to obtain and output at least one denoised signal.

In one embodiment, the method further comprises identifying the operation trace as being saturated and interpolating a peak value of the operation trace identified as saturated. In one embodiment, interpolating the peak value is performed using a fourth-order polynomial equation.

In one embodiment, the mathematical representation is a difference equation, wherein coefficients of the difference equation describe a shape of the plurality of victim calibration traces with respect to the plurality of aggressor calibration traces for each victim photosensitive element.

In one embodiment, finding the mathematical representation includes determining a cost function for the difference equation; calculating the coefficients by minimizing the cost function and the minimal value of the cost function; and comparing the minimal value of the cost function to a cost threshold.

In one embodiment, the difference equation is a linear time-invariant discrete equation.

In one embodiment, calculating the coefficients of the difference equation is performed using an optimization method. In one embodiment, the optimization method comprises a Levenberg-Marquardt method.

In one embodiment, when the minimal value of the cost function is above the cost threshold, the mathematical representation is determined using a template.

In one embodiment wherein the mathematical representation is a template, the template is weighted by the amplitude of the detection peak and aligned with a location of the detection peak.

According to another broad aspect of the present invention, there is provided a system for at least partially removing extrinsic static noise from full-waveform data obtained using an optical time-of-flight sensor. The system comprises an identification and parameter estimation unit, a peak detection unit and a crosstalk prediction unit. In one embodiment, an optional saturated summit completion unit is provided.

The identification and parameter estimation unit receives the aggressor and victim calibration traces from the sensor and outputs the mathematical representation and the predetermined threshold for the peak detection.

The peak detection unit receives the operation traces from the sensor and the predetermined threshold from the identification and parameter estimation unit and outputs the aggressor signals whose peaks are greater than the threshold with their victim operation traces.

The crosstalk prediction unit receives the mathematical representation from the identification and parameter estimation unit and the aggressor signal with its victim operation traces from the peak detection unit to predict and remove, at least partly, the extrinsic static noise generated by the aggressor signal on each victim operation trace. A denoised signal is outputted by the crosstalk prediction unit.

In one embodiment, an optional saturated summit completion unit is provided for interpolating a peak value of the operation trace identified as saturated by the peak detection unit.

In accordance with another broad aspect, there is provided a computer-implemented method for at least partially removing extrinsic static noise from data obtained by an optical time-of-flight sensor using full-waveform analysis and comprising a plurality of photosensitive elements, the method comprising use of at least one processor for: receiving a normal operation trace from a given one of the plurality of photosensitive elements and at least one neighbor trace from at least one neighbor photosensitive element; determining a peak value of the normal operation trace and comparing the peak value to a given threshold; identifying the normal operation trace as being an aggressor signal when the peak value is greater than the given threshold; determining a respective crosstalk caused by the aggressor signal in each one of the at least one neighbor trace, the respective crosstalk corresponding to a respective extrinsic static noise present in each one of the at least one neighbor trace; removing the respective crosstalk from each one of the at least one neighbor trace, thereby obtaining at least one denoised signal; and outputting the at least one denoised signal.

In accordance with a further embodiment, there is provided a system for at least partially removing extrinsic static noise from data obtained by an optical time-of-flight sensor using full-waveform analysis and comprising a plurality of photosensitive elements, the system comprising: a crosstalk determining module for: receiving a normal operation trace from a given one of the plurality of photosensitive elements and at least one neighbor trace from at least one neighbor photosensitive element; determining a peak value of the normal operation trace and comparing the peak value to a given threshold; identifying the normal operation trace as being an aggressor signal when the peak value is greater than the given threshold; and determining a respective crosstalk caused by the aggressor signal in each one of the at least one neighbor trace; and a denoising module for: removing the respective crosstalk from each one of the at least one neighbor trace, thereby obtaining at least one denoised signal; and outputting the at least one denoised signal.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

The Signal-to-Noise Ratio (SNR) of a time-of-flight sensor using full waveform analysis is representative of its measurement accuracy and precision. Two main types of noise can have a negative impact on the SNR: the static noise and the random noise. Both of these causes the deterioration of the SNR.

"Static noise" is the name given to a particular noise pattern in the photodiode signal which has a specific shape. The shape of the static noise can be time variant or time invariant. It can also depend on the operating conditions of the sensor. In the case of an optical system using full-waveform analysis, the static noise creates systematic errors on distance measurements of objects which may be lesser or greater than the correct value. The static noise typically degrades the accuracy of the sensor.

"Random noise" is the term given to a random fluctuation in the trace. The random noise is due to different sources of noise such as thermal noise, dark noise, shot noise and ambient light. Contrary to the static noise, the random noise has a zero mean. This random noise variance may be attenuated using a simple low-pass filter or by averaging several traces of the same scene. In the case of an optical system based on full-waveform analysis, the random noise creates random errors on the distance measurements of objects. The random noise typically degrades the precision of the device.

In the context of signal processing for an optical system using full-waveform analysis, distinguishing the noise from the useful signal may be an issue. In the present description, the problems of identifying, characterizing, and compensating or attenuating the static noise in order to improve the measurement accuracy are addressed.

The static noise is usually caused by electromagnetic fields (EMFs) produced by multiple electronic sources, by light contaminations generated from multiple reflections and by refraction of the light emitted by the sensor. Two types of static noise can be distinguished, namely the intrinsic static noise and the extrinsic static noise.

The extrinsic static noise is caused by the light backscattered by the object in the scene. It is produced by an optical pulse having a large amplitude. A large amplitude pulse, also called aggressor, received at a given photodiode creates various electric and electro-magnetic phenomena perturbing the operation of the photodiode(s) located in the neighborhood of the aggressor photodiode, called victim(s). The shape and the magnitude of the extrinsic static noise can be predicted from the shape and the magnitude of the aggressor pulse. Another example of extrinsic static noise is the case where a portion of the light received on a photodiode contained in a photodiode array may also be transmitted to another photodiode through the silicon layer installed to protect the photodiode array.

Figure 1:
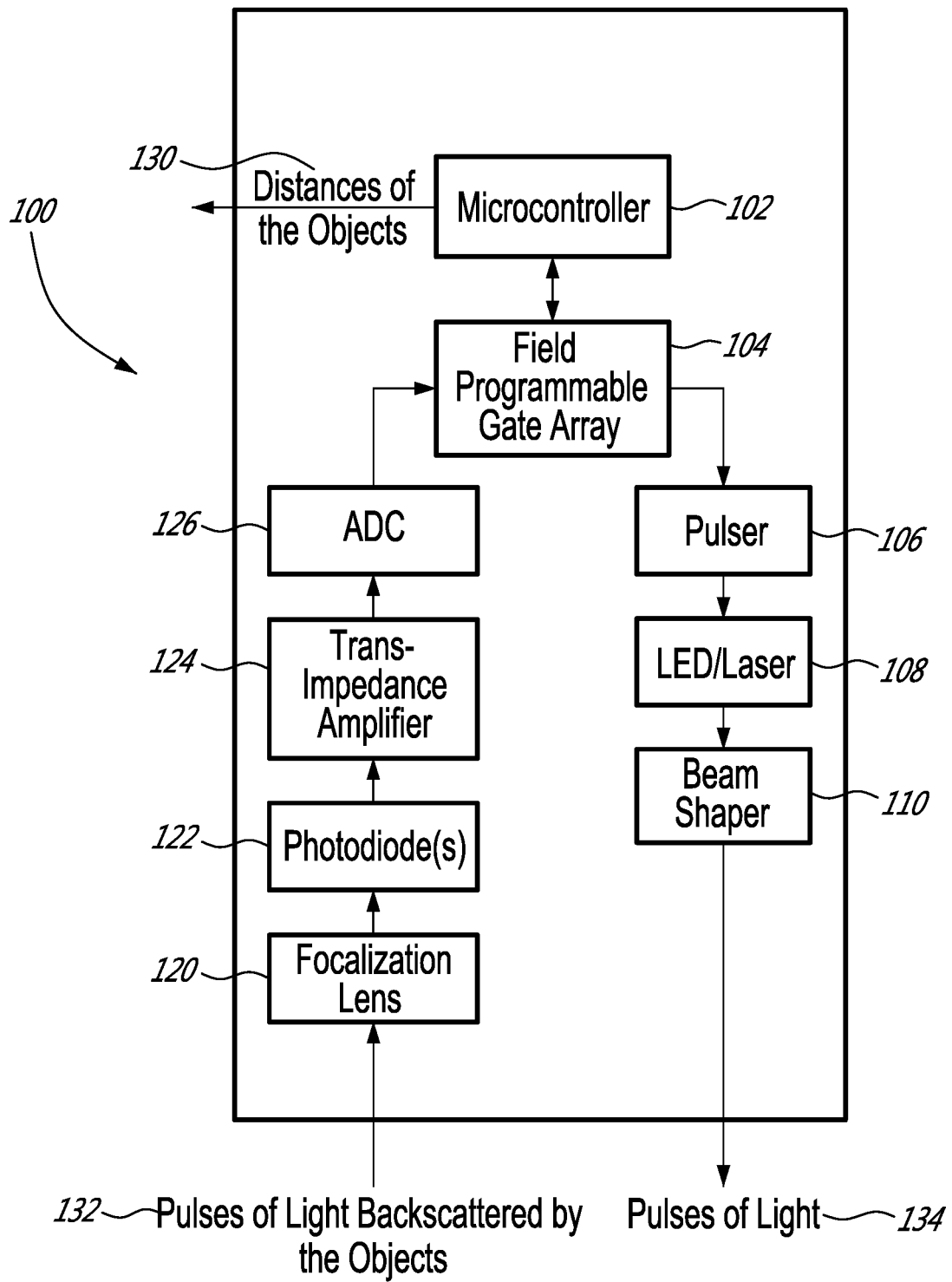
FIG. 1 is a block diagram illustrating an optical time-of-flight sensor using full-waveform analysis.

The present characterization and attenuation/removal methods are to be applied in relation with an optical time-of-flight sensor 100 using full-waveform analysis which is illustrated in FIG. 1. For the emission of pulses of light 134, the following steps occur. A pulser 106 pulses an LED/Laser light source 108 at a substantially constant rate. A beam shaper 110 shapes the light beam emitted by the LED/Laser light source 108 in order to obtain a desired sensor field of emission.

A portion of the pulses of light 134 sent into a detection zone is reflected back towards the optical time-of-flight sensor 100 as backscattered pulses 132. A focalization lens 120 focalizes the signal backscattered by objects present in the detection zone on the photo-sensitive surface of the photodiode 122. The focalization lens 120 is usually designed to match the sensor field of emission. Photodiode 122 converts the received photons into an electrical current. A TransImpedance Amplifier (TIA) 124 converts the variations of the electrical current passing through the photodiode 122 into a voltage. An Analog to Digital Converter (ADC) 126 converts the voltage outputted by the TIA 124 into a discrete number signal.

A Field Programmable Gate Array (FPGA) 104 controls the pulser 106 as well as the acquisition of the photodiode signal from the ADC 126. The generated pulses of light 134 are synchronized with the signal acquisition mechanism. It implements the oversampling and the accumulation principles which maximize the received Signal-to-Noise Ratio and increase the sampling resolution. Example processing aspects carried out by the signal acquisition mechanism and processor are described in U.S. Pat. No. 7,640,122, the contents of which is hereby incorporated by reference. The acquired signal is called a "trace". A trace is a sequence of ADC samples. The value of each sample corresponds to the amount of LED/Laser light, also called count, received by the photodiode at a given time. The shape of the trace is determined by the shape, the distance and the reflectivity of the objects backscattering the light emitted by the sensor. The trace is actually a sum of the object reflections in the sensor field of emission. The peaks in the trace correspond to the reflections induced by the objects in the sensor field of emission. The reflections induced by the objects located close to the sensor will appear earlier in the trace while the reflections due to a further object will appear later.

A microcontroller 102 synchronizes the operation of the components of the system. It also implements the signal processing algorithm that performs the static noise reduction and detects peaks in the trace in order to provide the distance of the detected objects 130.

The present method for characterizing and removing/attenuating the extrinsic static noise is described in the context of an optical system having a time-of-flight sensor using full-waveform analysis. The sensor comprises a plurality of photosensitive elements, such as photodiodes, located sufficiently close to one another to create crosstalk. The method for characterizing and attenuating the extrinsic static noise comprises two main steps.

The first step, called identification, is performed during the design of the sensor. This step consists in finding a mathematical representation of the extrinsic static noise generated in the victim signals. The victim signals are generated by victim photosensitive elements which are adjacent to a given aggressor photosensitive element and vary as a function of an aggressor signal received by the given aggressor photosensitive element. When the aggressor receives an optical signal having a high amplitude, it generates an electric signal that creates crosstalk in the signals generated by at least some of its neighboring photosensitive elements. The signal generated by the aggressor is referred to as the aggressor signal, and the signal generated by a victim is referred to as a victim signal. The victim signal contains extrinsic static noise to be removed or at least attenuated.

The second step, called operation, is carried out during sensor operation. This method consists in predicting the extrinsic static noise generated by the aggressor based on the characterization of the photosensitive element generated during the identification step and in subtracting the predicted signal from the victim signals to improve their SNR ratio.

Calibration Sub-Method

Figure 2:
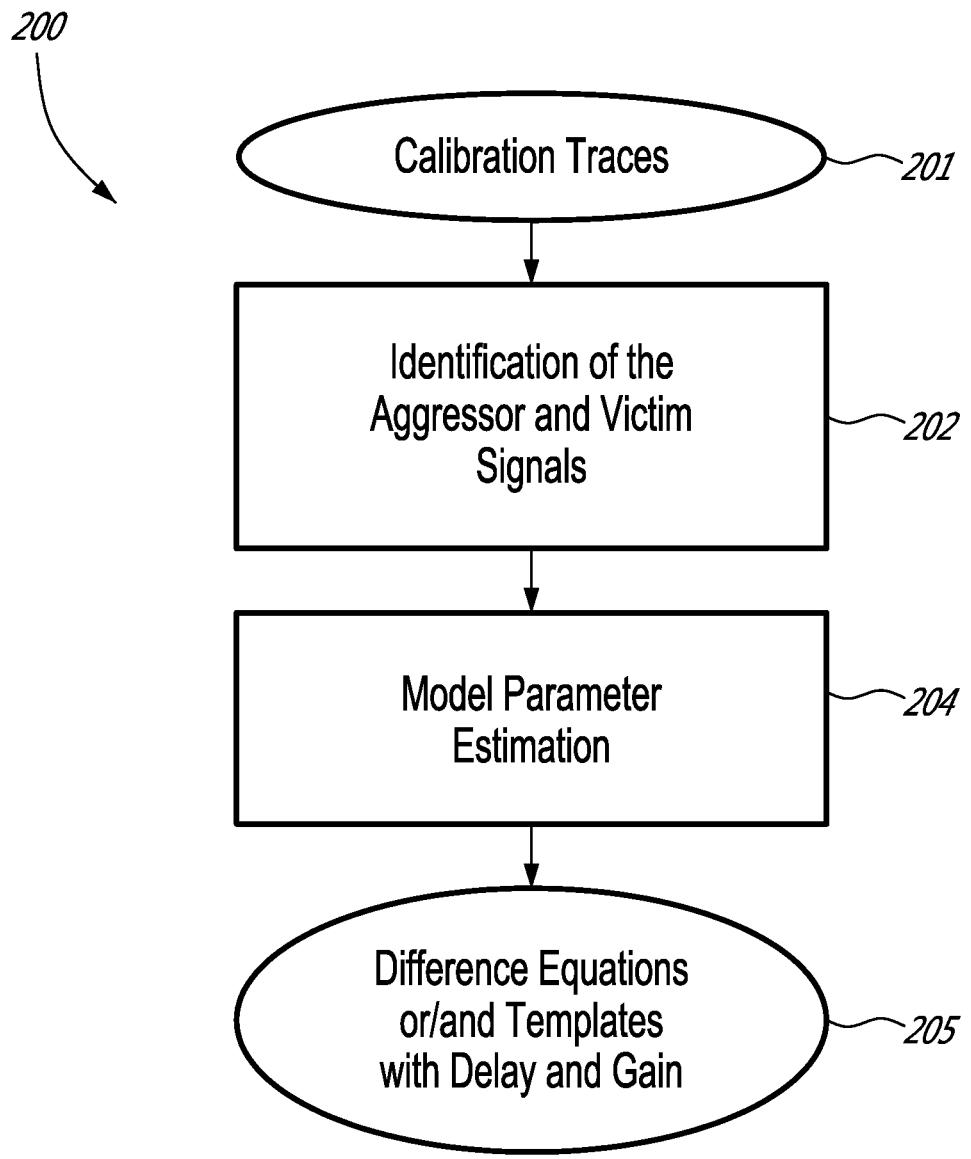
FIG. 2 is a flow chart illustrating example main steps of the calibration sub-method.

The identification step, also referred to as calibration sub-method 200, illustrated in FIG. 2, consists in finding the mathematical relation between a given aggressor signal and its victims. In order to do so, a plurality of aggressor signals with varying magnitude are generated on the photodiodes of the sensor. These are referred to as calibration traces 201. They are used to identify 202 the photodiodes in which perturbations are induced. Once the aggressors and their victims are identified, the parameters of a model 204 that predicts the shape of the crosstalk generated by each aggressor in each victim is determined. These models are used to predict the shapes of the crosstalk signals generated by a given aggressor during the operation of sensor in order to at least attenuate the crosstalk present in its victims. The prediction model can take several forms, but difference equations or configurable templates are typically established 205.

Figure 3:
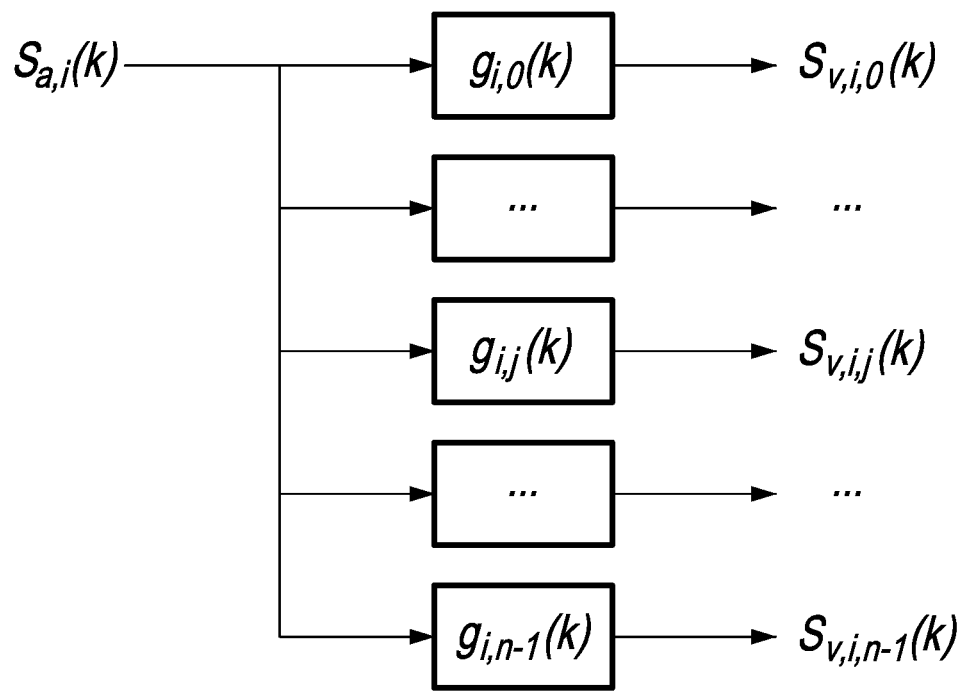
FIG. 3 shows difference equations describing the shapes and the amplitudes of the extrinsic static noise of the crosstalk signal induced by an aggressor signal in its victims, in accordance with an example embodiment.

In one embodiment, the relation between an aggressor signal and its victims can be described by a difference equation such as a linear time-invariant discrete equation, as illustrated in FIG. 3, where k is the trace samples, i is the aggressor photosensitive element, j is the victim photosensitive element, $s_{a,i}(k)$ is the aggressor signal in the photosensitive element i and $s_{v,i,j}$ is the perturbation induced by the aggressor i in the photosensitive element j.

The difference equation between the aggressor signal i and victim signal j denoted $s_{i,j}(k)$ may be expressed as follows:

$$s_{i,j}(k) = -a_{N-1,i,j} s_{i,j}(k-N-1) - a_{N-2,i,j} s_{i,j}(k-N-2) - \ldots$$
$$- a_{1,i,j} s_{i,j}(k-1) + b_{N-1,i,j} s_i(k-N-1) + b_{N-2,i,j} s_i(k-N-2) + \ldots + b_{1,i,j} s_i(k-1) + b_{0,i,j} s_i(k) \quad \text{Eq. 1}$$

where N is the order of the difference equation, b and a are apriori unknown coefficients.

The coefficients of the difference equation describing the shapes of the victims with respect to an aggressor signal are determined using experimental data. This process consists in finding the coefficients of Eq. 1 that minimize the squared difference between the victim signal predicted from the aggressor with the difference equation and the measured victim signal over several traces. The following steps are performed in order to determine the coefficients of the difference equation.

An aggressor signal i is created in a given photodiode element of the sensor while adjacent photodiodes are obstructed. Several traces are captured while varying the amplitude of the aggressor signal. The $l^{th}$ measured aggressor signal is denoted $\tilde{s}_i(l,k)$.

For each victim j, several traces are captured concurrently with the capture of the traces of the aggressor signal. The $l^{th}$ measured victim signal is denoted $\tilde{s}_{i,j}(l,k)$. In some cases, an aggressor signal does not affect a given photosensitivity element in its neighborhood. In that case, the coefficients of the difference equation describing the relation between these elements are set to zero.

The following optimization problem is solved for the difference equation coefficients using the Levenberg-Marquardt method or any other optimization algorithm:

$$\{b_{n-1,i}, \ldots b_0, a_{n-1,i}, \ldots a_1\} = \operatorname{argmin} \frac{1}{F}\frac{1}{E}\sum_{l=0}^{F-1}\sum_{k=0}^{E-1}(s_{i,j}(l,k) - \tilde{s}_{i,j}(l,k))^2 \quad \text{Eq. 2}$$

where E is the number of samples in a trace, F is the number of acquired traces, $\tilde{s}_{i,j}(l,k)$ is the $k^{th}$ sample of the $l^{th}$ acquired trace and $s_{i,j}(l,k)$ is the $k^{th}$ sample of the victim signal predicted using the $l^{th}$ aggressor signal using Eq. 1.

In some cases, the relation between the aggressor and its victims cannot be expressed accurately using a difference equation. For example, the phenomena causing the crosstalk may be too complex to be modelled using a simple linear time-invariant model. In another example, the number of difference-equation coefficients required to model the crosstalk is too high to allow a real-time implementation of the solution. In cases where the relation cannot reliably be modeled by a difference equation or a limited-order difference equation, the shape of the crosstalk signal is predicted using a template weighted by the maximum amplitude of the aggressor signal and aligned with the location of the maximum peak of the aggressor.

In order to determine whether a difference equation may be used, the minimum value of the cost function used in the optimization problem presented in Eq. 2 is monitored and compared to a predefined threshold. When the minimum value of the cost function is above the predefined threshold, the difference equation is considered not to be a reliable representation of the phenomenon occurring between the aggressor and the victims and a predefined template is used for modeling the relation between the aggressor and its victims. The following steps are performed to generate the noise template.

An aggressor signal i is created in a given photodiode element of the sensor and F traces are captured while varying the amplitude of the aggressor signal. The $l^{th}$ measured aggressor signal is denoted $\tilde{s}_i(l,k)$.

For each victim j, several traces are captured concurrently with the capture of the traces of the aggressor signal. The $l^{th}$ measured victim signal is denoted $\tilde{s}_{i,j}(l,k)$.

The template $t_{i,j}(k)$ is established by normalizing the victim traces and averaging the normalized traces of the victim as expressed in the following equation:

$$T_{i,j}(k) = \frac{1}{f} \sum_{l=0}^{f-1} \frac{\tilde{s}_{i,j,l}(l,k)}{u_l - l_l} \qquad \text{Eq. 3}$$

where $u_l$ and $l_l$ correspond respectively to the maximum and the minimum intensity value of $l^{th}$ trace of the victim signal.

The gain A and the delay d between the position of the maximum peak of the aggressor and the template $T_{i,j}(k)$ that minimize the squared sum of the difference between the weighted/delayed template and the measured victims are determined. The optimization problem is presented below:

$$\{A,d\} = \mathrm{argmin} \Sigma_{l=0}^{f-1} \Sigma_{k=0}^{e-1} (AT(k-m_i-d) - \tilde{s}_{i,j}(l,k))^2 \qquad \text{Eq. 4}$$

where $m_i$ is the position of the maximum peak of the aggressor i evaluated using a quadratic interpolation of the aggressor summit.

Operation Sub-Method

Figure 4:
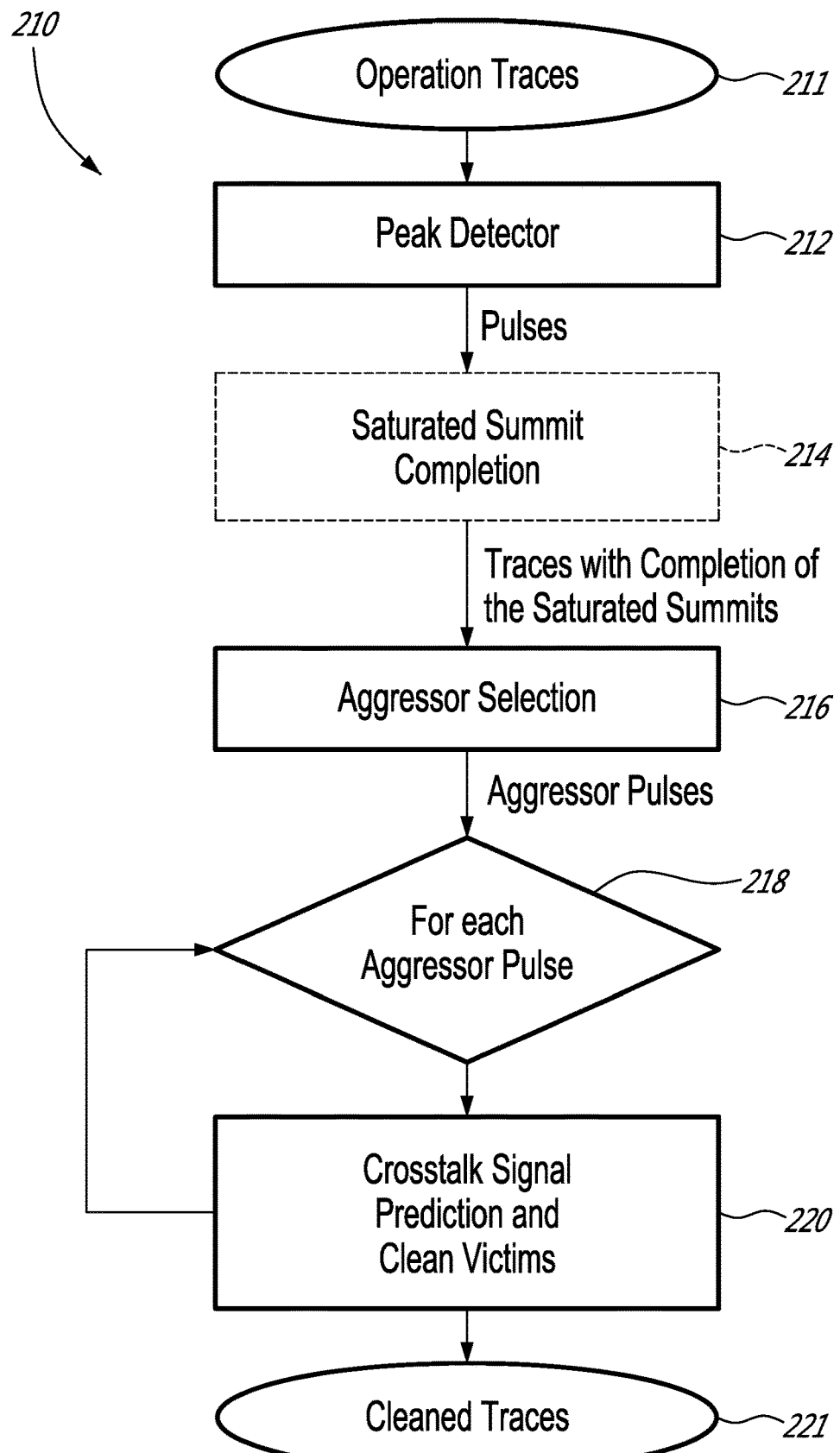
FIG. 4 is a flow chart illustrating example main steps of the operation sub-method.

Once the difference equations or the templates describing the relations between the aggressor and the victim are established 205, they are used to remove or at least attenuate the extrinsic static noise in the traces of the victims using the operation sub-method 210 illustrated in FIG. 4. A plurality of operation traces 211 are generated on the photodiodes of the sensor. The shapes of the operation traces 211 are determined by the presence of objects in the field-of-view of the sensor. The attenuation/removal of the extrinsic static noise comprises the following steps. The first step 212 consists in detecting pulses in the trace of each photodiode element, as described below. The second step 214, which is optional, consists in completing the summit of any saturated pulses to remove the discontinuities in the trace of the aggressor, if any. The third step 216 consists in determining which ones of the detected pulses have an amplitude sufficient to generate crosstalk (that is, to be an aggressor) in other photodiode elements. If the amplitude is considered sufficient to generate crosstalk 218, the last step consists 220 in attenuating/removing the crosstalk generated by each aggressor in the traces of each of its victims using either the difference equation or the crosstalk template established 205 during calibration. The cleaned photodiode traces or signals are outputted 221.

Figure 5:
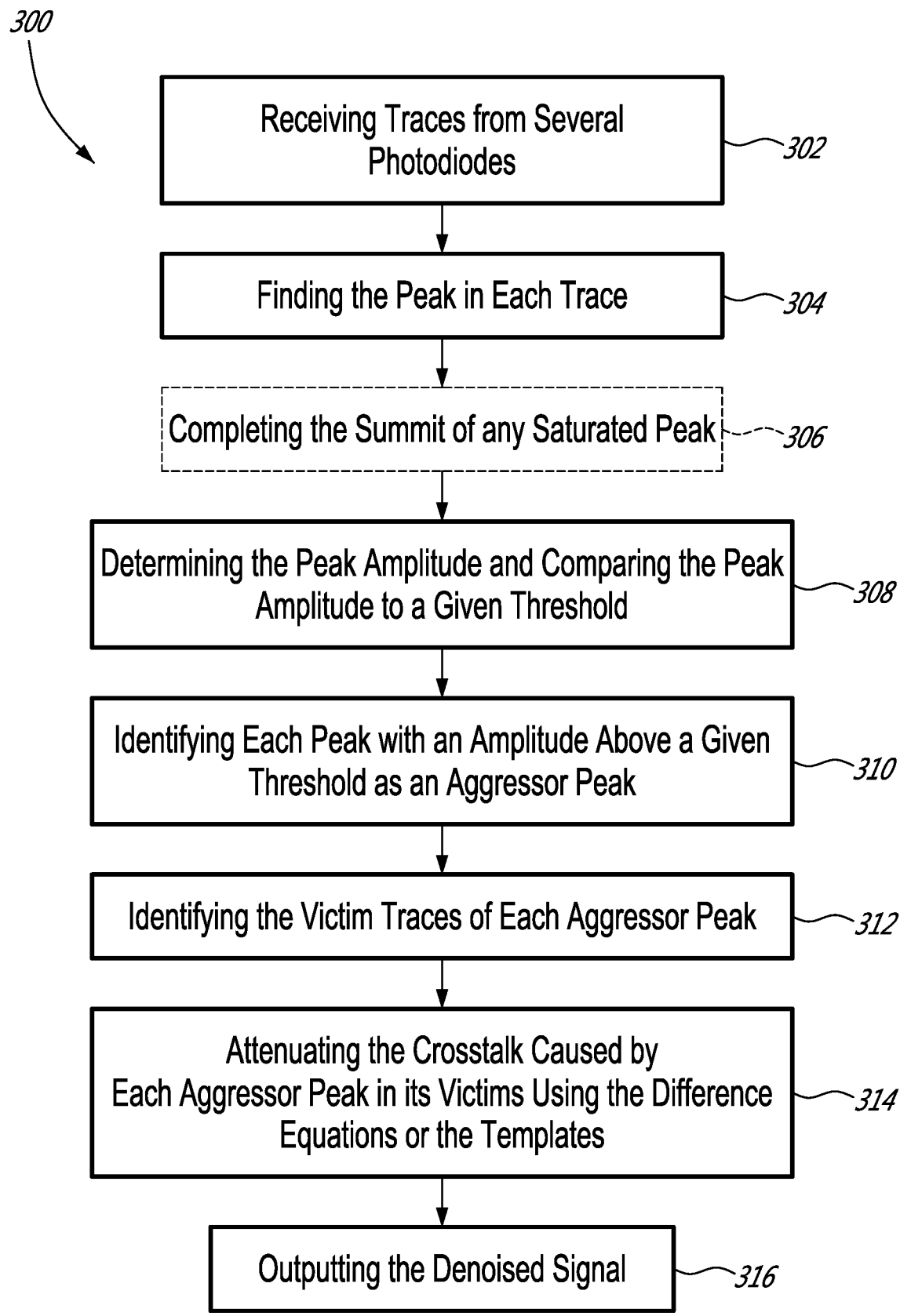
FIG. 5 is a flow chart illustrating a method for at least partially removing an extrinsic static noise from a trace, in accordance with an example embodiment.

FIG. 5 illustrates one embodiment of a method 300 for at least partially removing extrinsic static noise in a signal obtained by an optical time-of-flight sensor using full-waveform analysis. The first step 302 consists in concurrently receiving the traces from the photosensitive elements. The peaks in each acquired trace are localized at step 304. The summits of the saturated peaks, if any, are optionally completed using at step 306. At step 308, the values of the peaks found at the previous step are compared to a given threshold. The peaks with a maximum value higher than a given threshold are identified as aggressor peaks at step 310. The victim traces of each aggressor peak are identified at step 312. The crosstalk caused by each aggressor signal is then removed or at least attenuated from its victim traces at step 314, thereby obtaining the denoised traces. Finally, the denoised signal is outputted at step 316.

Peak Detection

Figure 6:
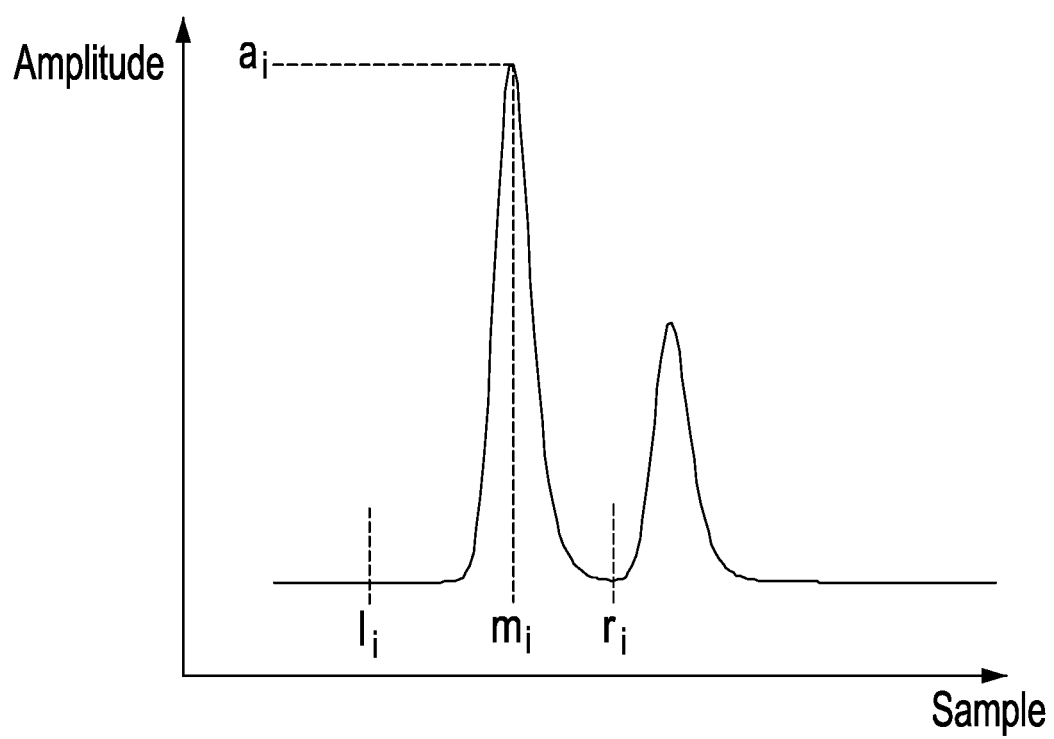
FIG. 6 is an exemplary graph of the amplitude of an aggressor signal as a function of time.

The pulsed light backscattered by the objects in the scene creates Gaussian shaped pulses in the traces. The peak detector function detects these pulses in the trace s(k) of length e. Referring to FIG. 6, each detected pulse i is characterized by the following parameters, namely an amplitude $a_i$, the index of their right side limit $r_i$, the index of the left side limit $l_i$, and the index of their maximum peak $m_i$.

Figure 7:
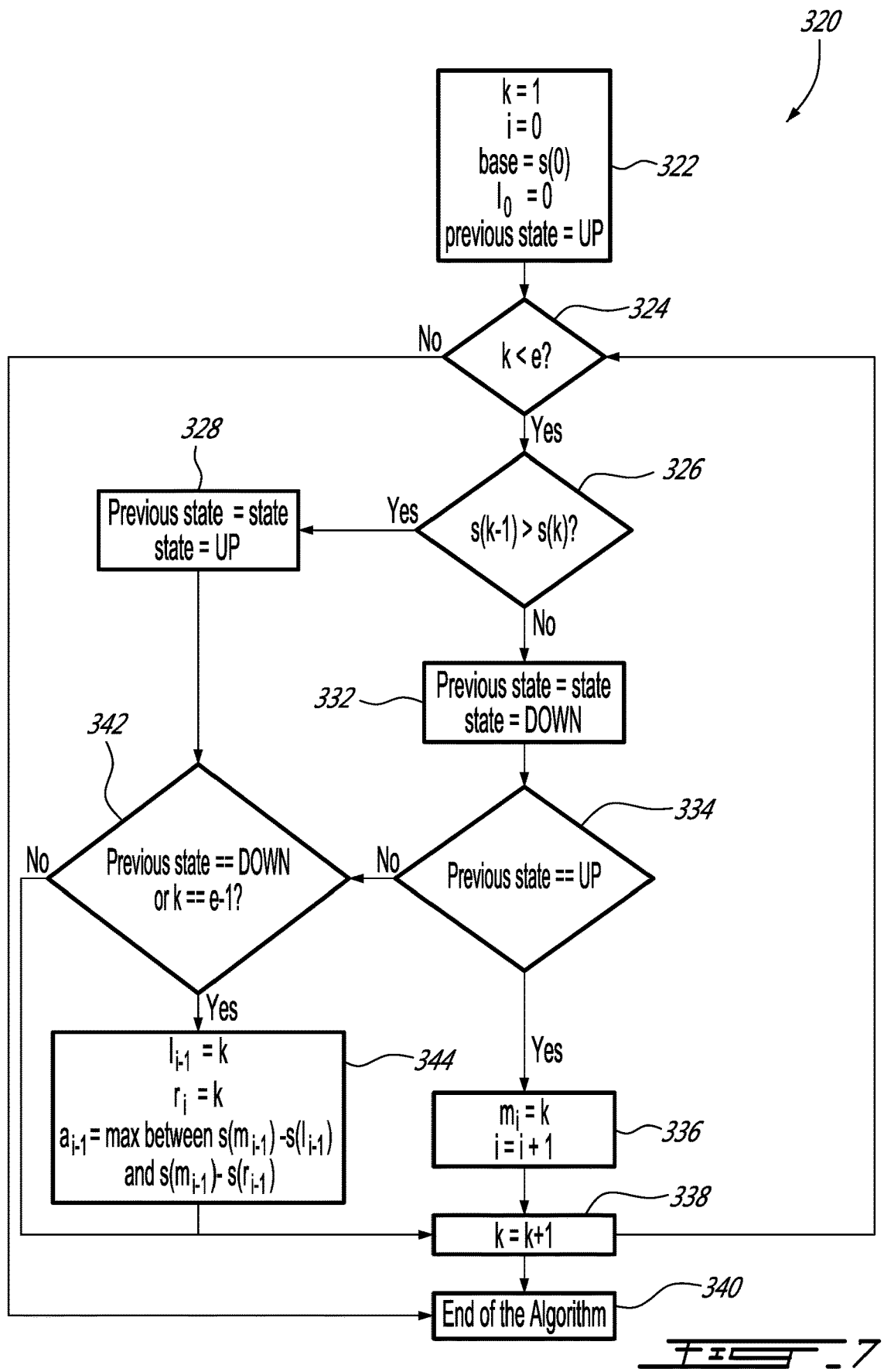
FIG. 7 is a flow chart illustrating a method for detecting a peak in a trace, in accordance with an example embodiment.

The peak detection method 320 is described in FIG. 7. This method can be seen as a state machine that finds the local maxima in the trace. Once located and characterized by the parameters presented above, each local maximum corresponds to a peak. The peaks of high amplitude are considered as aggressors. The method starts at 322 by assuming that the first sample is potentially the left side limit of the first peak in the trace. The method also assumes that the first sample is located on the rising edge of this peak. Thereafter, the method verifies each sample of the trace one after the other until they have all been checked 340. For each sample, the algorithm checks if one of the following three cases occurs.

Case 1. The value of the previous sample is greater than the value of the current sample 326, the states are updated 328 and the previous sample is located on the rising edge of current peak 342. The previous sample is then a local maximum. The algorithm then assigns the maximum index and the amplitude of the current peak 344 and loops back to verifying the next sample 324, after having updated the index of the sample 338.

Case 2. The value of previous sample is smaller than the value of current sample 326, the states are updated 332 and the previous sample is on the falling edge of the current peak 334. The previous sample is the right side limit of the current pulse and the current sample corresponds to the left side limit of the next pulse in the trace 336. The algorithm then loops back to verifying the next sample 324, after having updated the index of the sample 338.

Case 3. None of the previous cases occur and the algorithm loops back to verifying the next sample 324 until the end of the algorithm 340.

When the method of FIG. 7 is performed, the left and right side limits of each detected pulse are readjusted so that they do not exceed a predefined distance (in samples) from the index of the pulse maximum. As described below, this consideration may help reducing the computational burden of the crosstalk removal algorithm.

Saturated Summit Completion

Figure 8:
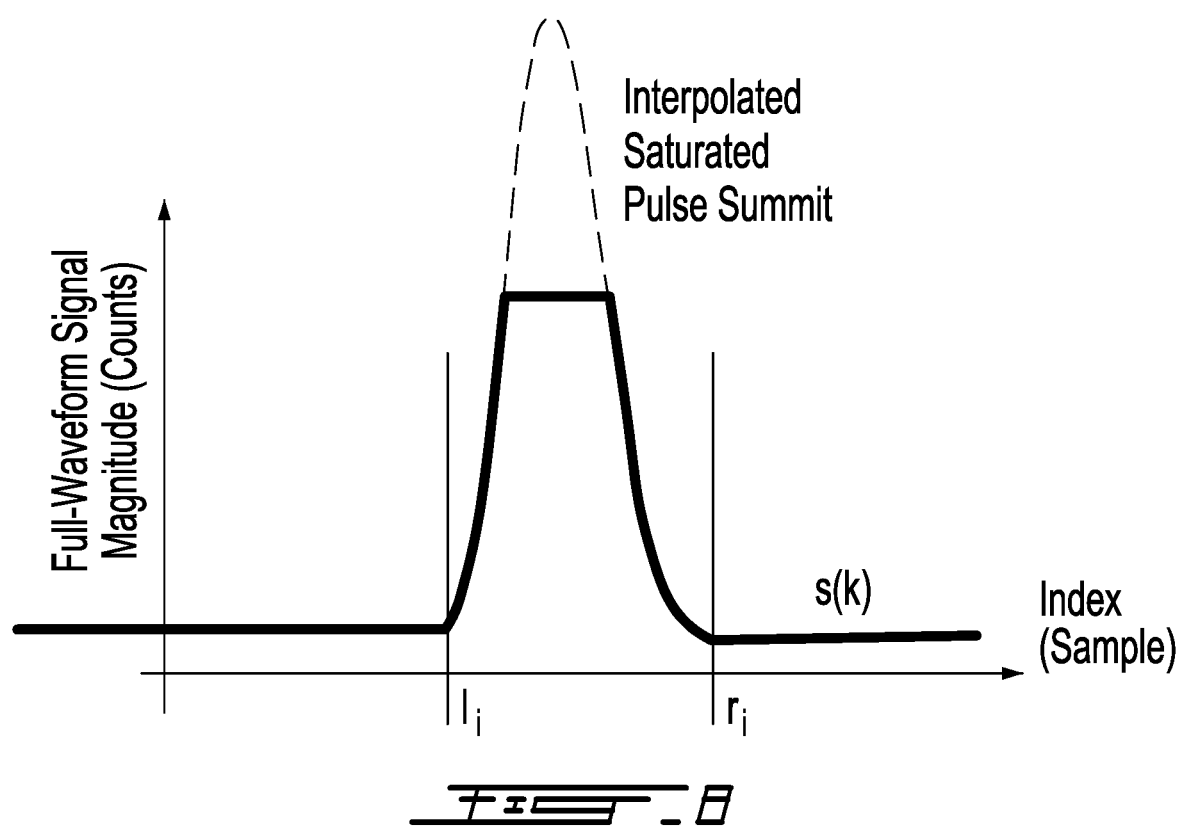
FIG. 8 illustrates the interpolation of a peak of a saturated trace, in accordance with an example embodiment.

The crosstalk signals are directly linked to the aggressor signals. When the aggressor signal is saturated, the response of the difference equation is erroneous or the position of its maximum peak is uncertain which creates difficulties in aligning the crosstalk template. The interpolation of the summit of the saturated peak allows mimicking the shape of the equivalent non-saturated signal and hence obtaining a more accurate prediction of the crosstalk signal. FIG. 8 illustrates a saturated summit with its interpolated summit completion.

Many approaches can be taken to perform the saturated summit completion. Such an approach can be using a template of a perfectly shaped pulse that is fitted on the non-saturated sample of the pulse using a specialized optimization algorithm. Another approach consists in interpolating the summit of the pulse using a fourth-order polynomial equation of the following form:

$$s(k) = ak^4 + bk^3 + ck^2 + dk + e \qquad \text{Eq. 5}$$

where a, b, c, d and e are the coefficients of the interpolation polynomial. The number of coefficients of this polynomial equation has been chosen to include sufficient degrees of freedom to accommodate the following constraints.

The polynomial equation passes through three points: the non-saturated sample before the saturation plateau, the non-saturated sample after the saturation plateau and a sample centered on the saturated plateau with a value corresponding to the amplitude of the pulse if it was not saturated (3 constraints). The expected amplitude of the saturated pulse is computed using an empirical equation that depends on the width of the saturation plateau. This equation is built with experimental data taken as follows. The light source of the sensor is set to its maximum intensity in order to obtain a strongly saturated signal from a highly reflective target installed close to the sensor. The width of the saturation is computed. The intensity of the light source is decreased until the saturation disappears. Knowing the light dimming factor needed to avoid saturation and the amplitude of the pulse obtained with dimmed light, the amplitude of the saturated pulse can be extrapolated using a simple product rule. This exercise is repeated for many widths of the saturation plateau in order to formulate the empirical equation (polynomial equation or piecewise function) that relates the amplitude of the saturated pulse as a function of the width of the saturation plateau.

The transition between the non-saturated samples of the pulse and the interpolated sample should be smooth. In order to do so, the derivative of the polynomial equation with respect to k should be equal to the derivative of the trace at the samples before and after the saturation plateau (2 constraints).

The derivative of the previous equation is given by:

$$\frac{ds}{dk} = 4ak^3 + 3bk^2 + 2ck + d \quad \text{Eq. 6}$$

The coefficients of Eqs. 13 and 14 are estimated using the following constraints:

$$k_1 = 0, s_1 = s(l_i - 2), \frac{ds_1}{dk} = \frac{ds}{dk}(l_i - 2) \quad \text{Eq. 7}$$

$$k_2 = \frac{k_1 + k_3}{2}, s_2 = s(k_2 + l_i - 2) \quad \text{Eq. 8}$$

$$k_3 = w + 4, s_3 = s(k_3 + l_i - 2), \frac{ds_3}{dk} = \frac{ds}{dk}(k_3 + l_i - 2) \quad \text{Eq. 9}$$

where w corresponds to the number of sample of the saturation plateau.

The derivative constraints at samples $l_i-2$ and $r_t+2$ ensure a smooth transition between the original signal and the interpolation section. Substituting Eq. 7 in Eqs. 5 and 6, the following equation system is obtained:

$$s_1 = e \quad \text{Eq. 10}$$

$$s_2 = ak_2^4 + bk_2^3 + ck_2^2 + dk_2 + e \quad \text{Eq. 11}$$

$$s_3 = ak_3^4 + bk_3^3 + ck_3^2 + dk_3 + e \quad \text{Eq. 12}$$

$$\frac{ds_1}{dk} = d \quad \text{Eq. 13}$$

$$\frac{ds_3}{dk} = 4ak_3^3 + 3bk_3^2 + 2ck_3 + d \quad \text{Eq. 14}$$

This equation system can be solved for a, b, c, d and e using the equations given bellow:

$$a = \frac{A - B - D(k_2 - k_3)}{(k_2^2 - k_3^2) - 2k_3(x_1 - x_3)} \quad \text{Eq. 15}$$

$$b = \frac{C - 2B}{k_3} - 2k_3 \quad \text{Eq. 16}$$

$$c = B - ak_3^2 - bk_3 \quad \text{Eq. 17}$$

$$d = \frac{ds_1}{dk} \quad \text{Eq. 18}$$

$$e = s_1 \quad \text{Eq. 19}$$

where A, B, C and D are defined as follows:

$$A = \frac{s_2 - s_1 - \frac{ds_1}{dk}k_2}{x_2^2} \quad \text{Eq. 20}$$

$$B = \frac{\left(s_3 - s_1 - \frac{ds_1}{dk}k_3\right)}{k_3^2} \quad \text{Eq. 21}$$

$$C = \frac{\frac{ds_3}{dk} - \frac{ds_1}{dk}}{x^3} \quad \text{Eq. 22}$$

$$D = \frac{C - 2B}{k_3} \quad \text{Eq. 23}$$

Aggressor Selection

The aggressor selection function simply determines if a given pulse can generate crosstalk based on its amplitude. A pulse is considered an aggressor when its amplitude is greater that a predefined threshold. If the pulse of a given signal is below the predefined threshold, then the given signal is not considered an aggressor.

Crosstalk Attenuation

Two techniques for predicting the crosstalk signal shape as a function of the aggressor signal have been presented. The first technique consists in defining the difference equations describing the shape of the crosstalk generated on the victims as a function of the aggressor signal. The second technique consists in defining a template weighted and aligned using the amplitude and the position of the maximum peak of the aggressor signal. The calibration method predicts the shape of the crosstalk in the victims by using the difference equations or the crosstalk templates. The prediction of the crosstalk signal generated by an aggressor on a given segment using the difference equation simply consists in computing the responses of the difference equations to the aggressor signal. The prediction of the crosstalk signals using templates is more complex. The template is scaled by a factor proportional to the aggressor amplitude. The template is then aligned with the position of the maximum peak of the aggressor. An interpolation technique may be used to increase the performance of the crosstalk attenuation. The amplitude factor as well as the number of sample shift or subsample shift (for more precision) of the template have been identified during calibration. The predicted shapes of the crosstalk generated by an aggressor in the victim signals are subtracted. To speed-up the computation time, it is assumed that the aggressor only affects its victims between its left and right side index limits determined by the peak detector algorithm presented above.

Overall Method

The overall computer-implemented method which includes the identification/calibration sub-method and the operation sub-method can be summarized as follows. It is a method for at least partially removing extrinsic static noise from full-waveform data obtained using an optical time-of-flight sensor. The sensor has a plurality of synchronized photosensitive elements, at least some are positioned in proximity thereby allowing electromagnetic crosstalk caused by an aggressor photosensitive element to affect at least one victim photosensitive element. The method includes the following steps:

Receiving a plurality of aggressor calibration traces from the aggressor photosensitive element and a plurality of victim calibration traces from at least one victim photosensitive element. The aggressor calibration traces and the victim calibration traces are obtained in a controlled environment wherein an amplitude of a calibration peak of the aggressor calibration traces is varied and no object is present in a field-of-view of the victim photosensitive element(s).

Finding a mathematical representation of the electromagnetic crosstalk present in the plurality of victim calibration traces for each victim photosensitive element using the aggressor calibration traces and the victim calibration traces.

Determining a predetermined threshold for each victim photosensitive element using the aggressor calibration traces and the victim calibration traces. The predetermined threshold corresponds to a minimum amplitude of the calibration peak of the aggressor calibration traces at which the electromagnetic crosstalk is present in the plurality of victim calibration traces.

Receiving an operation trace from the aggressor photosensitive element. The operation trace is obtained in an uncontrolled environment wherein a shape of a detection peak of the operation trace is determined by a presence of an object in a field-of-view of the optical time-of-flight sensor during normal operation, the shape including an amplitude and a location of the detection peak.

Comparing the amplitude of the detection peak of the operation trace to the predetermined threshold and identifying the operation trace as being an aggressor signal created by the aggressor photosensitive element if the amplitude of the detection peak is greater than the predetermined threshold.

Receiving at least one synchronized victim operation trace from the victim photosensitive element.

Predicting the extrinsic static noise generated by the aggressor signal on the synchronized victim operation trace using the mathematical representation for each victim photosensitive element to generate a predicted crosstalk signal.

Removing the predicted crosstalk signal from the synchronized victim operation trace to obtain and output at least one denoised signal.

In one embodiment, the method further comprises identifying the operation trace as being saturated and interpolating a peak value of the operation trace identified as saturated. In one embodiment, interpolating the peak value is performed using a fourth-order polynomial equation.

In one embodiment, the mathematical representation is a difference equation, wherein coefficients of the difference equation describe a shape of the plurality of victim calibration traces with respect to the plurality of aggressor calibration traces for each victim photosensitive element.

In one embodiment, finding the mathematical representation includes determining a cost function for the difference equation; calculating the coefficients by minimizing the cost function and the minimal value of the cost function; and comparing the minimal value of the cost function to a cost threshold.

In one embodiment, the difference equation is a linear time-invariant discrete equation.

In one embodiment, calculating the coefficients of the difference equation is performed using an optimization method. In one embodiment, the optimization method comprises a Levenberg-Marquardt method.

In one embodiment, when the minimal value of the cost function is above the cost threshold, the mathematical representation is determined using a template.

In one embodiment wherein the mathematical representation is a template, the template is weighted by the amplitude of the detection peak and aligned with a location of the detection peak.

Overall System

Figure 9:
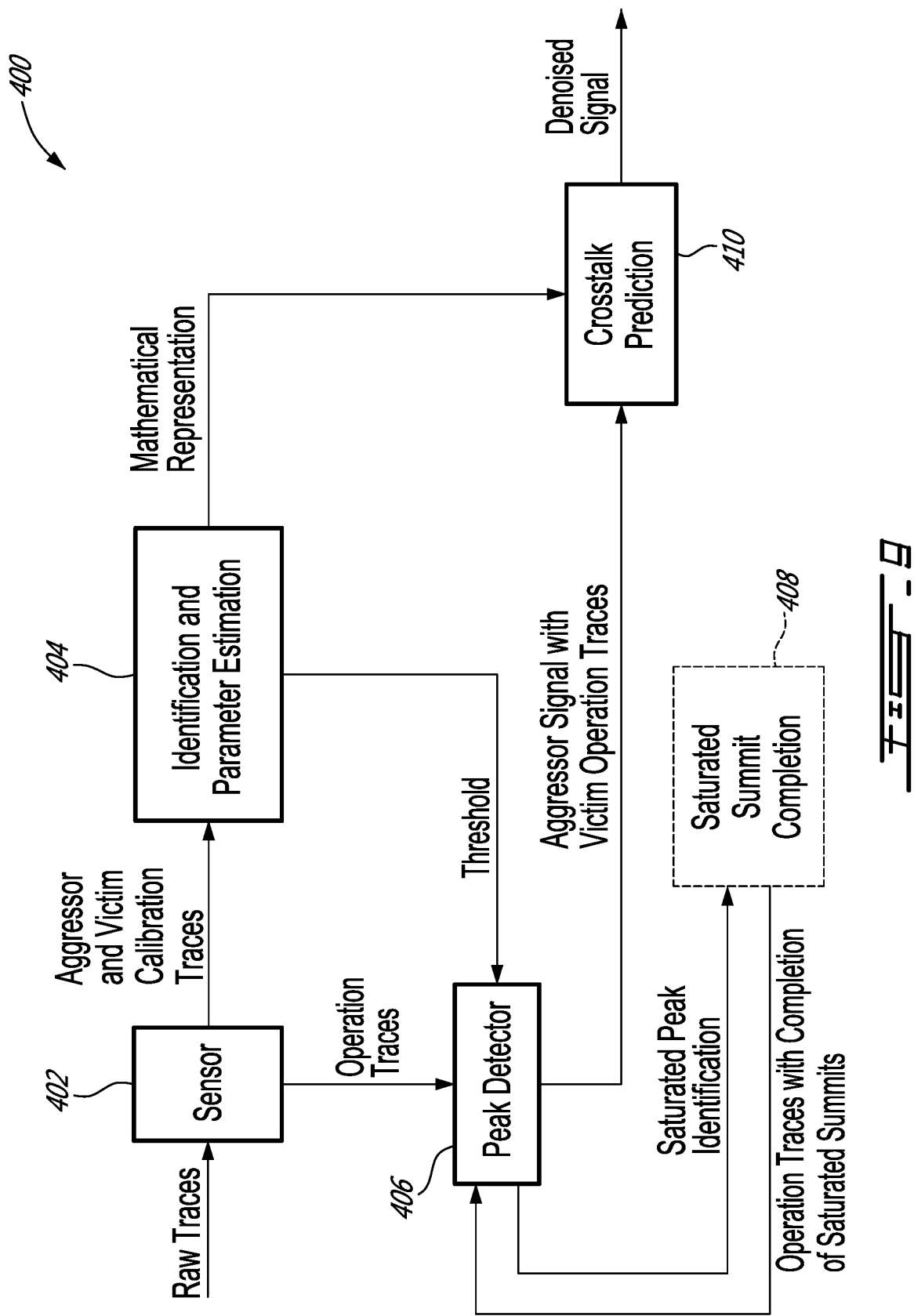
FIG. 9 illustrates a system for at least partially removing extrinsic static noise, in accordance with an example embodiment.

The methods described above can be embodied as a system, an example of which is shown in FIG. 9. The system 400 is for at least partially removing extrinsic static noise from full-waveform data obtained using an optical time-of-flight sensor. The optical time-of-flight sensor 402 has a plurality of synchronized photosensitive elements. At least some of the synchronized photosensitive elements are positioned in proximity thereby allowing electromagnetic crosstalk caused by an aggressor photosensitive element to affect at least one victim photosensitive element. The system comprises an identification and parameter estimation unit 404, a peak detection unit 406, a crosstalk prediction unit 410 and an optional saturated summit completion unit 408.

The identification and parameter estimation unit 404 receives the aggressor and victim calibration traces from the sensor 402 and outputs the mathematical representation and the predetermined threshold for the peak detection.

The peak detection unit 406 receives the operation traces from the sensor 402 and the predetermined threshold from the identification and parameter estimation unit 404 and outputs the aggressor signals whose peaks are greater than the threshold with their victim operation traces.

The crosstalk prediction unit 410 receives the mathematical representation from the identification and parameter estimation unit 404 and the aggressor signal with its victim operation traces from the peak detection unit 406 to predict and remove, at least partly, the extrinsic static noise generated by the aggressor signal on each victim operation trace. A denoised signal is outputted by the crosstalk prediction unit 410.

In one embodiment, an optional saturated summit completion unit 408 is provided for interpolating a peak value of the operation trace identified as saturated by the peak detection unit 406.

As will be readily understood, the crosstalk prediction unit 410 carries out its prediction and removal for all operation peaks detected by the peak detection unit 406 in each aggressor operation traces and for all aggressor traces. A trace from one photodiode of an array can be, simultaneously, an aggressor to one or many other photodiodes and a victim of a plurality of other photodiodes acting as aggressors and all crosstalk contributions are addressed by the crosstalk prediction unit 410 to ensure that the system has considered all crosstalk sources prior to outputting the denoised signal.

The identification and parameter estimation unit 404, the peak detection unit 406, the optional saturated summit completion 408 and the crosstalk prediction unit 410 are provided by at least one processing unit configured for executing their respective method steps. Memories and communications means are provided as required.

Examples

The results presented in the examples below were obtained using a Galaxy™ sensor designed and manufactured by LeddarTech.

Figure 10:
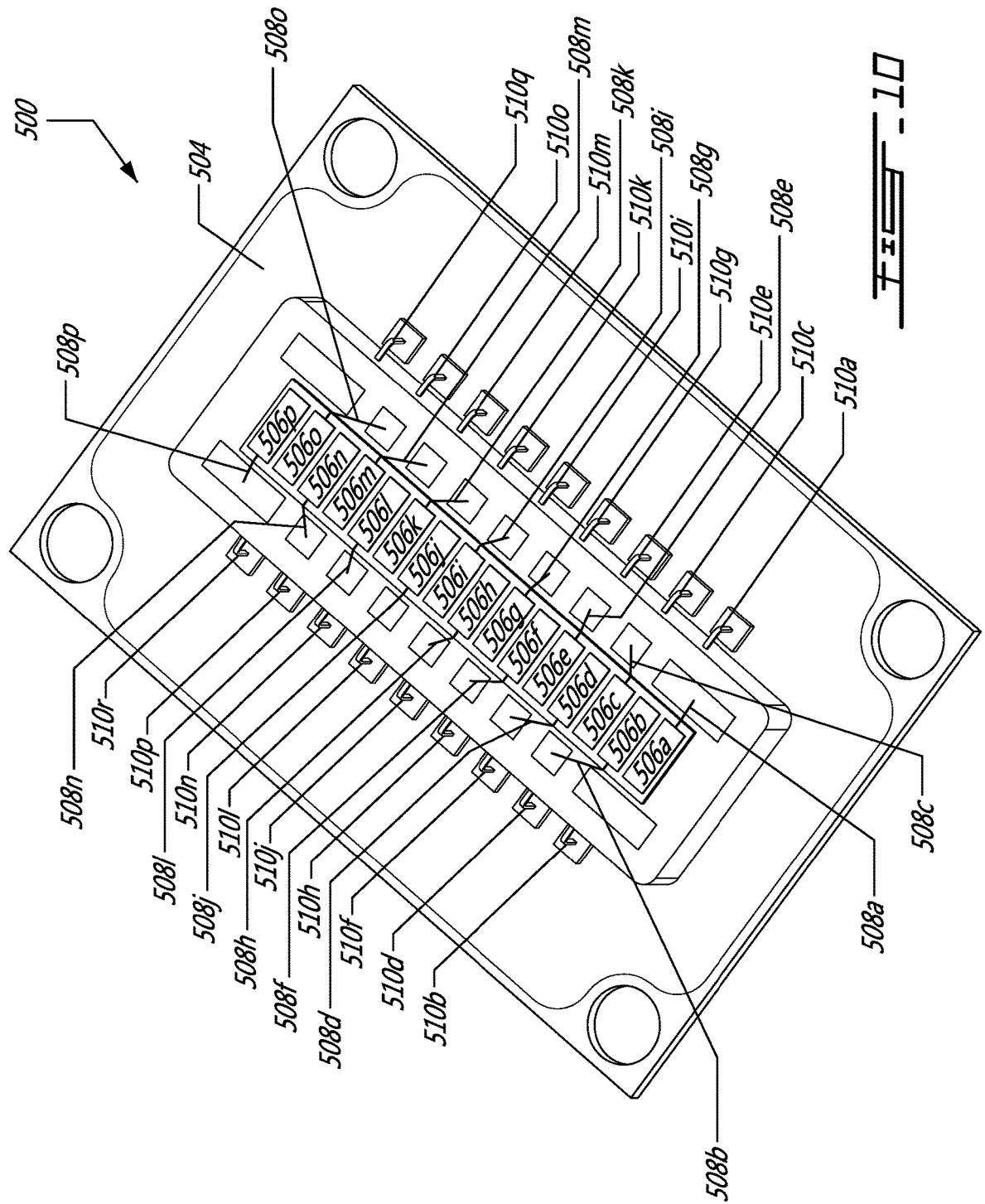
FIG. 10 illustrates an array of photodiodes with their wire bounds.

FIG. 10 shows an example setup 500 in which a photodiode array chip 502 is provided on a PCB 504. The chip 502 includes a plurality of photodiodes 506a to 506p, collectively referred to as photodiode array 506 having photodiodes 506x. Each photodiode 506x of the array is connected by a wire 508x to a PCB track 510x. Adjacent photodiodes are typically not connected to adjacent PCB tracks. For example, photodiode 506c is adjacent to photodiode 506b and photodiode 506d. Photodiode 506c is connected by wire 508c to PCB track 510c. PCB tracks 510a and 510e are adjacent to PBC track 510b. If photodiode 506c is determined to be an aggressor because of the amplitude of its operation trace, it will usually create crosstalk, or extrinsic static noise, on the signals of its adjacent photodiodes 506b and 506d (its immediate neighbors) and on the signals of photodiodes 506a and 506e which have adjacent PCB tracks. The victims of photodiode 506c, when it is considered an aggressor, will therefore include neighboring photodiodes 506a, 506b, 506d and 506e, which are all located in proximity to photodiode 506c.

A. Adjacent Wire Bound

Crosstalk between adjacent Printed Circuit Board (PCB) tracks, referred to as adjacent wire bound crosstalk, is one of the most common problems observed with sensors using photodiode arrays. This type of crosstalk is dependent on the PCB design. The aggressor signal is the source of the EMF which radiates and contaminates surrounding tracks (victims). In the example of FIG. 10, the victims of photodiode 506c, when it is considered an aggressor, due to adjacent wire bound crosstalk will therefore include photodiodes 506a and 506e.

Figure 11:
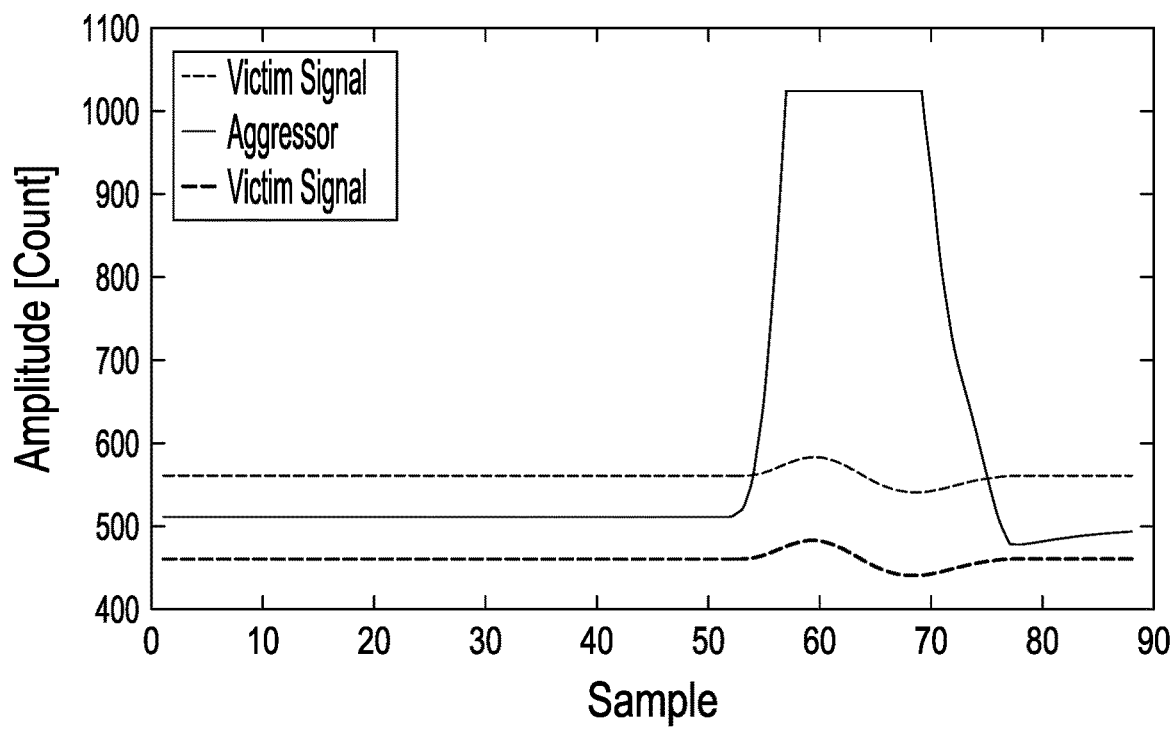
FIG. 11 is a graph which illustrates the amplitude of a saturated aggressor pulse signal and two victim signals as a function of time, in accordance with an example embodiment.

The first step consists in generating a signal on the aggressor photodiode while no object is present in the field of view of the victims. One way of controlling that no object is present in the field of view of the victim photodiodes is to mask or cover the photosensitive areas of the potential victims. Example generated signals are illustrated in FIG. 11.

Figure 12:
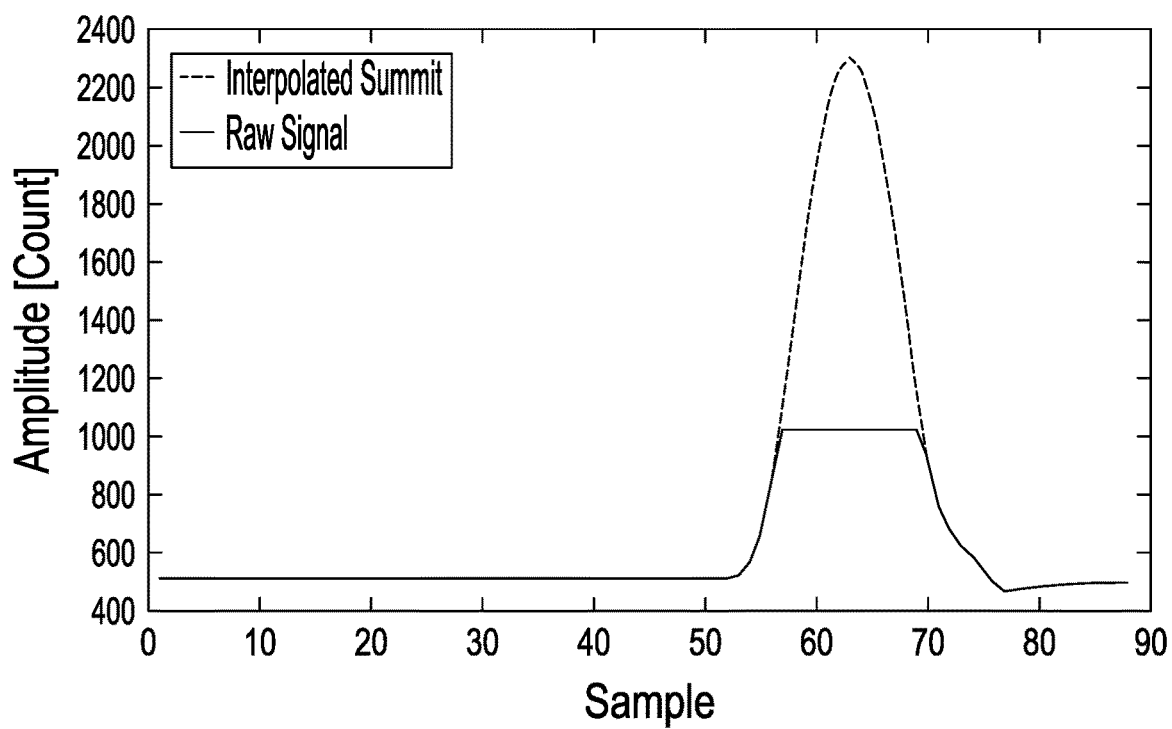
FIG. 12 is a graph which illustrates an interpolated summit for the truncated aggressor signal of FIG. 11, in accordance with an example embodiment.

The amplitude of the signal aggressor is then varied to ensure that only the amplitude of the victim varies as a function of the aggressor amplitude. In other words, there exists a static gain between the aggressor and victim shapes. As described above, the wide dynamic range of signal exceeds the input voltage range of the ADC. The signal is truncated at the maximum value that the ADC can convert. The saturated completion summit function is used to interpolate the summit of the saturated aggressor pulse in order to use all of the available signal range in the optimization algorithm, as illustrated in FIG. 12.

The coefficients of a second-order (N=3) Infinite Impulse Response (IIR) filter are identified by solving the optimization problem presented above. The value of the arrival function cost is lower than a convergence threshold, which means that the identified difference equation of the IIR filter adequately describes the shape of the crosstalk signal as a function of the aggressor pulse. The difference equation between the aggressor signal i and the victims j is:

$$s_{i,j}(k)=0.5438*s_{i,j}(k-3)-0.3781*s_{i,j}(k-2)-1.9301*s_{i,j}(k-1)-0.2289*s_i(k-3)+0.1445*s_i(k-2)+0.1442*s_i(k-1)-0.0644*s_i(k) \quad \text{Eq. 24}$$

Figure 13:
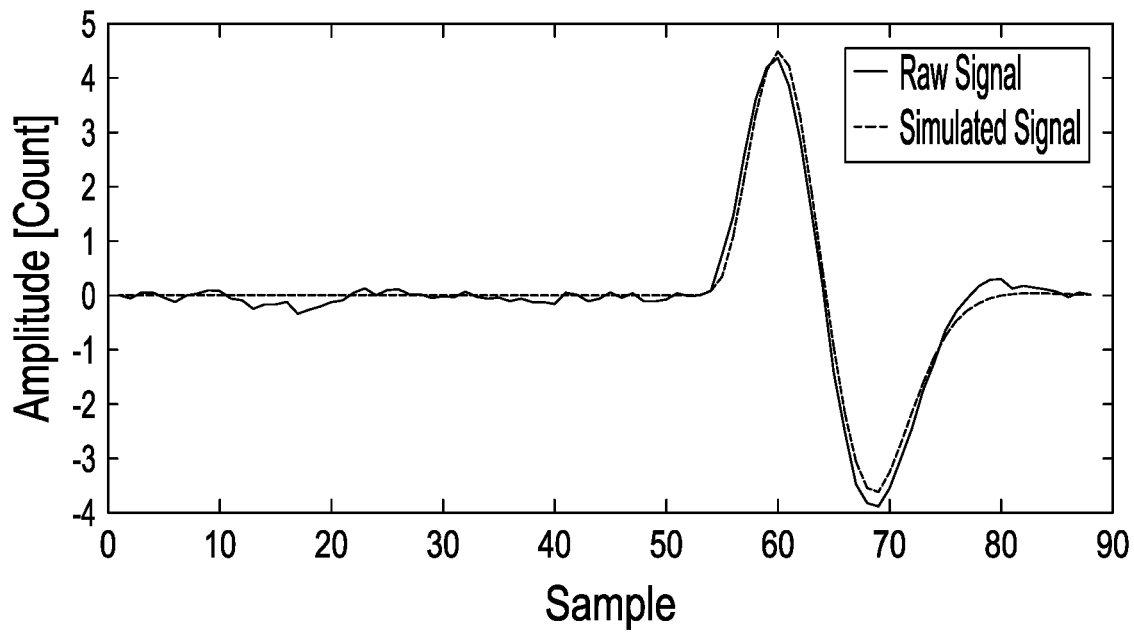
FIG. 13 is an exemplary graph of the amplitude as a function of time for a measured trace and a corresponding simulated trace.

A comparative study of the signals shows that Eq. 24 is adequate to predict adjacent wire bound crosstalk as shown in FIG. 13.

It has been observed that the crosstalk suddenly disappears when the magnitude of the aggressor signal is equal to 15 counts. In order to avoid a discontinuity during the compensation when the aggressor signal is around 15 counts, the gain is gradually increased from 1 to 100 when the aggressor signal is between 60 and 15 counts as shown below:

$$A=-2.2*s_1+133 \quad \text{Eq. 25}$$

Figure 14:
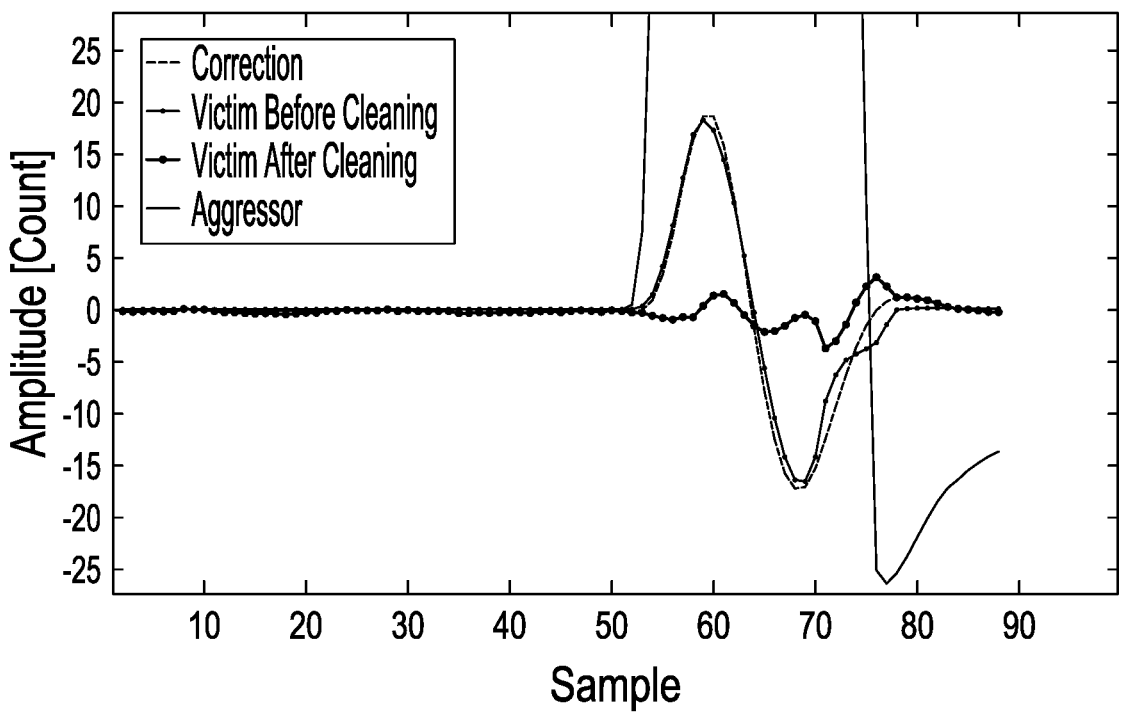
FIG. 14 is an exemplary graph of the amplitude as a function of time for a victim signal prior to denoising and after denoising, in the case of crosstalk induced by an aggressor signal with adjacent wire bound.

If the aggressor signal is above 60, then the gain A is equal to 1. The equation to remove the crosstalk is the following:

$$s_{cl}(k) = s_{raw}(k) - \frac{s_{i,j}(k)}{A} \quad \text{Eq. 26}$$

where $s_{cl}(k)$ is the clean signal, $s_{raw}(k)$ is the raw signal, $s_{i,j}(k)$ corresponds to the difference equation predicting the shape of the victim signal from the aggressor signal and A is a gain. FIG. 14 shows example resulting curves for a compensated victim signal.

B. Adjacent Photocells

Crosstalk generated between adjacent photocells or photosensitive elements is now analyzed. This type of crosstalk is caused by results of electro-magnetic interferences occurring inside the Positive Intrinsic Negative (PIN) diode. In the example of FIG. 10, the victims of photodiode 506c, when it is considered an aggressor, due to the proximity of the cells will therefore include photodiodes 506b and 506d.

The first step consists in generating an aggressor in a given photocell while adjacent photodiodes are masked in order to observe only the shape and the amplitude of the crosstalk signal.

The amplitude of the signal aggressor is then varied on its entire range. The saturated completion summit function is used to interpolate the summit when the pulses are saturated.

In this example, the number of difference equation coefficients is set to 3. In solving the optimization problem presented in Eq. 2, using the Levenberg-Marquardt algorithm, the value of the function cost is never lower than the predefined threshold. Consequently, one concludes that the transfer function is too complex to be modelled using a simple time-invariant model or that the number of coefficients of the difference equation required to model the phenomena is too high.

Figure 15:
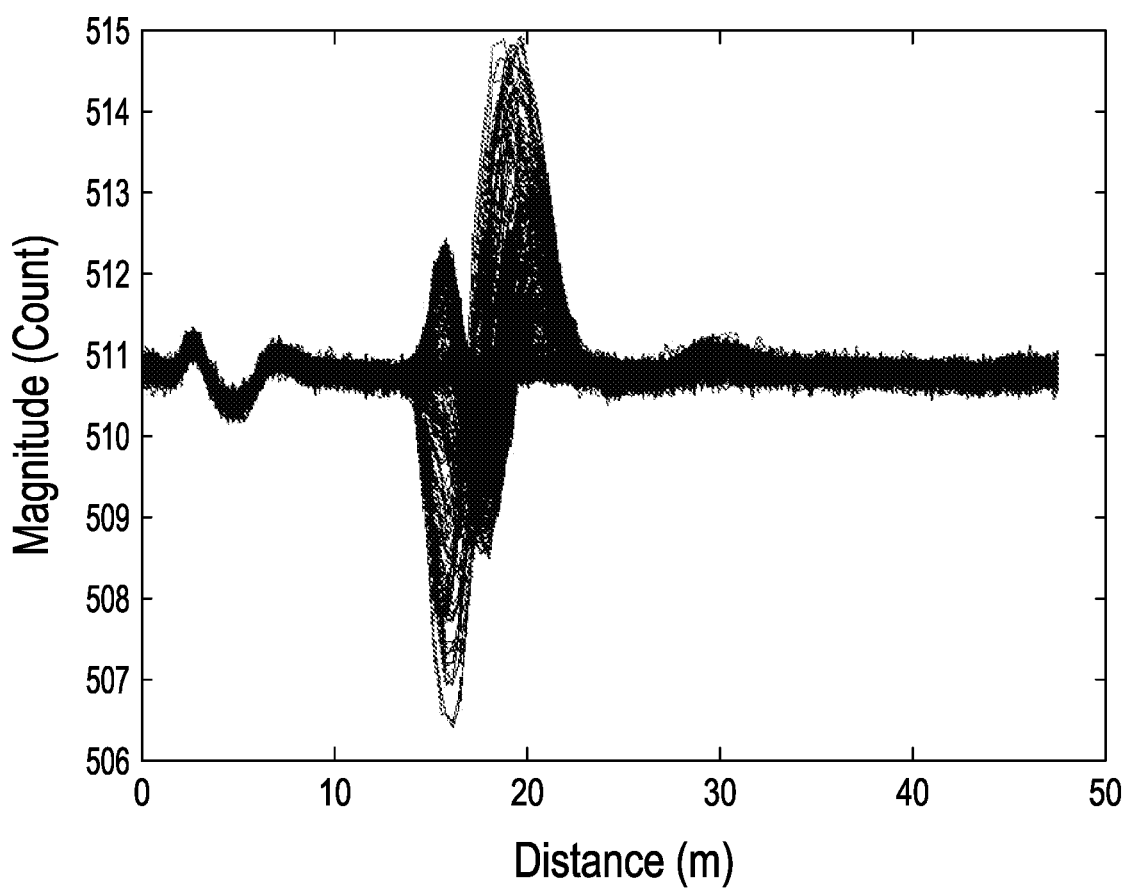
FIG. 15 is a graph which illustrates curves that correspond to the trace in the adjacent channels of the aggressor when the transverse position of the target in the aggressor channel is moved, in accordance with an example embodiment.

An experimental study of the signals shows that the shape of adjacent photocells crosstalk is difficult to predict as a function of the aggressor pulse since its shape varies as a function of the position of the target in the aggressor photodiode element. This phenomenon is illustrated in FIG. 15. The curves correspond to the trace in the adjacent channels of the aggressor when the position of the target in the aggressor channel is moved. The adjacent-photocell crosstalk signal passes from a shape corresponding to the second derivative of the aggressor signal to its first derivative while the target is moving inside the photocell. The signal is unpredictable since one of the independent variables that determines its shape (position of the object in the photocell) is not available. By adding external information about the position of the object in the photocell, the proposed method and system can be used as described to attenuate this type of crosstalk in the victim.

C. Single Cathode Wire Bounding

Figure 16:
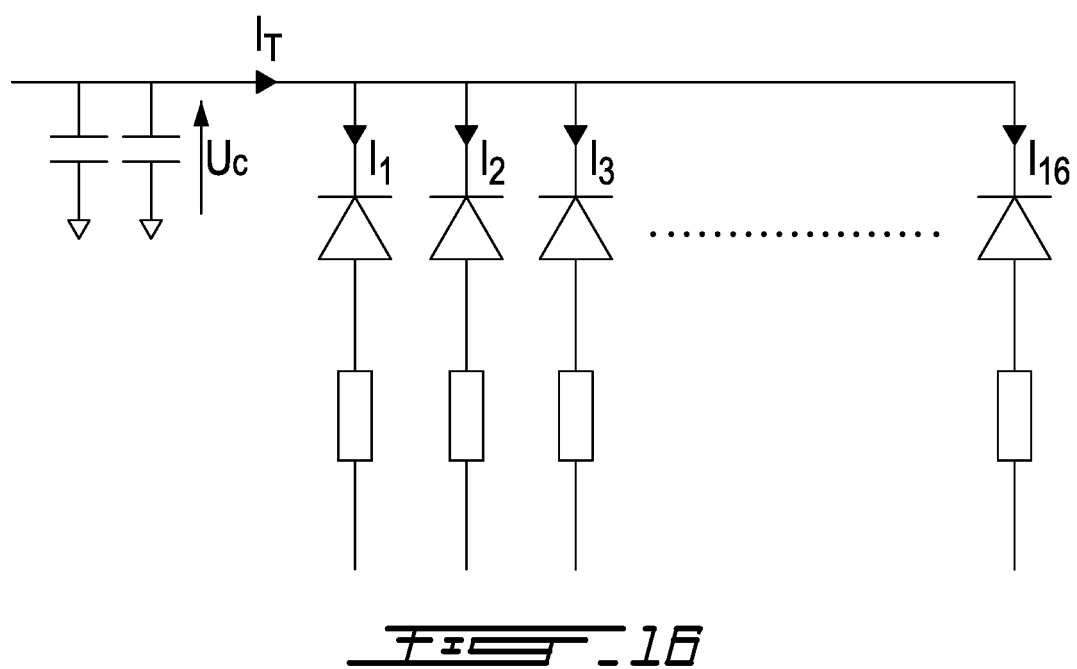
FIG. 16 illustrates an array of photodiode with single cathode wire bonding, in accordance with another embodiment.

An adjacent-photocell crosstalk signal depends on the characteristics and structure of the photodiode array. Due to single cathode wire bounding, also known as common cathode, the current ($I_T$) through the cathode is the sum of the currents through each anode ($I_1 \ldots I_6$). An example setup is illustrated in FIG. 16. When several photodiodes are traversed by a strong signal, the total current through the photodiode creates a perturbation on the voltage of the capacitors (Uc) which affects the photodiodes.

Figure 17:
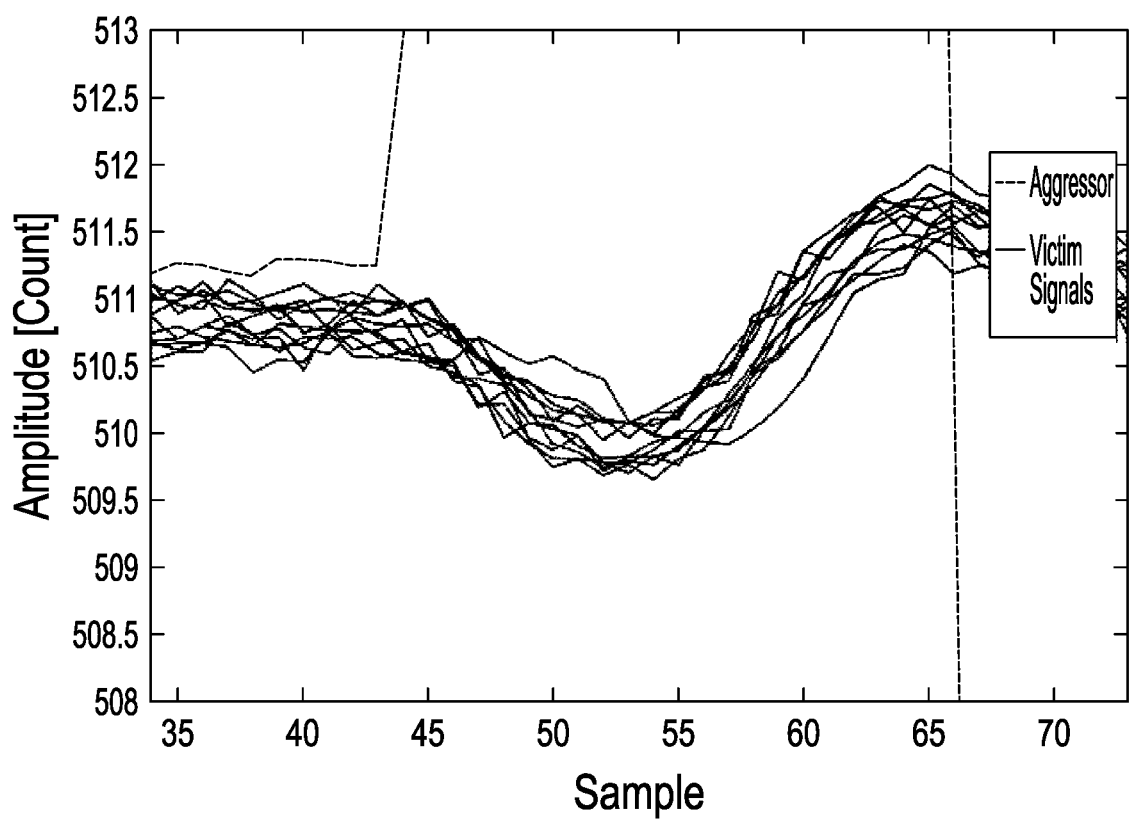
FIG. 17 is an exemplary graph of the amplitude of an aggressor signal and its twelve victim signals in an example case of a single cathode wire bonding issue as a function of time.

The first step is to generate an aggressor signal in a given photodiode while there is no object present in the field of view of the other photodiodes in order to determine which photodiode will be affected by the single cathode wire bounding crosstalk. One way to achieve this controlled environment is to mask the other photodiodes. FIG. 17 illustrates the photodiode signals affected by single cathode wire bounding crosstalk. Typically, single cathode wire bounding causes one aggressor to affect the other photodiodes sharing its cathode.

The amplitude of the aggressor signal is varied on the entire possible range. The saturated completion summit function is used to interpolate the summit when the pulses are saturated.

Figure 18:
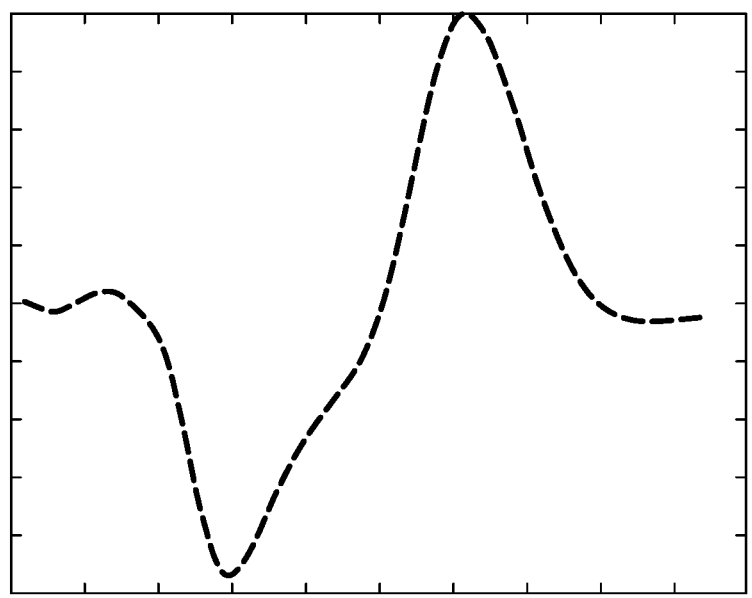
FIG. 18 illustrates a template for removing extrinsic static noise caused by a single cathode wire bounding in accordance with an example embodiment.

The number of difference equation coefficients is set to 3. When the optimization problem is solved using the Levenberg-Marquardt algorithm, the value of the function cost is never lower than a threshold. One can conclude that the single cathode wire bounding phenomenon is too complex to be modelled using a limited-order time-invariant model. The shape of the perturbation is then be predicted using a predefined template illustrated in FIG. 18.

An experimental study of the signals shows that the shape of the victim signal is proportional to the template. In order to generate this template, a given number of adjacent photodiodes are activated while the others are hidden. The signals from the photodiodes hidden from light and that do not contain any other type of crosstalk correspond to the single cathode wire bounding crosstalk induced by the signal in the activated photodiodes. The normalized signals of these photodiodes are averaged to generate the template. This template is used to predict the crosstalk signal of a given aggressor on the other photodiodes that share their cathode with the aggressor. If the sensor has more than one operating condition which impacts the shape of the pulse, a template is generated for each of these operating conditions. The gain and the delay between an aggressor signal and its victim signals are obtained from the optimization problem described above. Their value is A=1024 and d=0.375.

Figure 19:
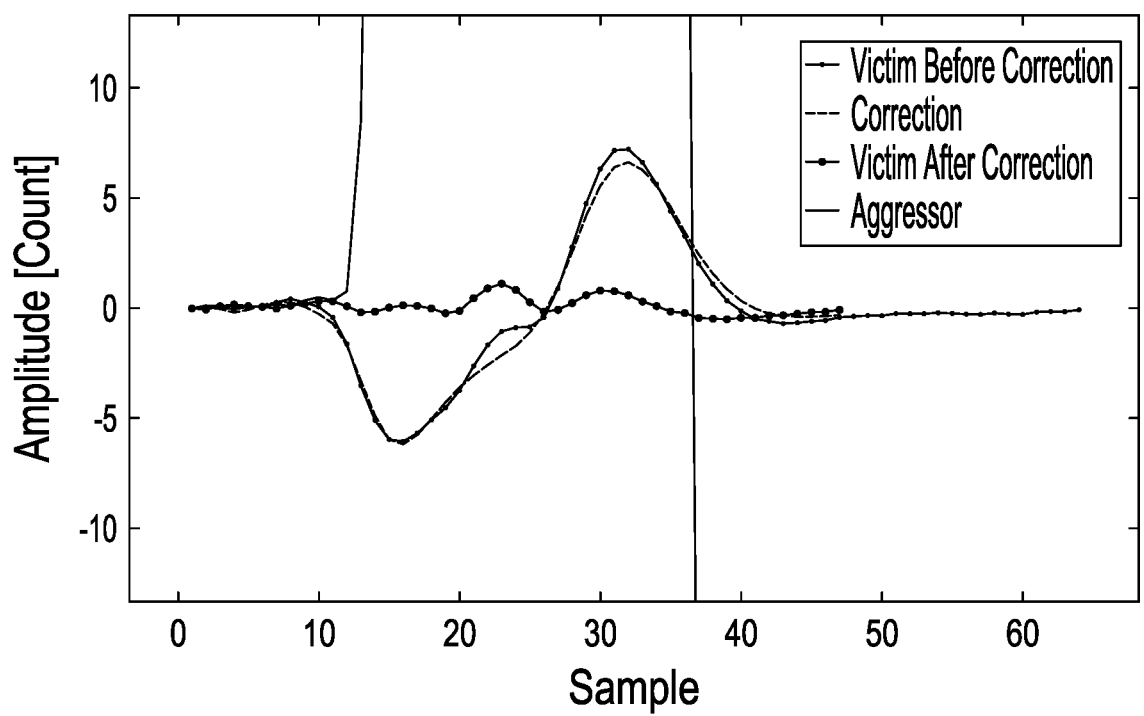
FIG. 19 is an exemplary graph of the amplitude of a victim signal prior to denoising and after denoising in the case of crosstalk induced by single cathode wire bounding as a function of time.

As described above, the amplitude of the victim signals depends on the amplitude of the aggressor signals:

$$s_{cl}(k) = s_{raw}(k) - \frac{T}{A}(k-d) \qquad \text{Eq. 27}$$

wherein T is the adjacent photocell crosstalk template and d is the delay between the raw signal and the template. To reduce the number of required calculations, the contribution of each aggressor signal is stored in a temporary buffer. When the last aggressors are processed, this buffer is removed from each victim. FIG. 19 illustrates a compensated victim signal.

The embodiments described above are intended to be exemplary only. The scope of the invention is therefore intended to be limited solely by the scope of the appended claims.

The invention claimed is:

1. A computer-implemented method for at least partially removing extrinsic static noise from full-waveform data obtained using an optical time-of-flight sensor having a plurality of synchronized photosensitive elements, at least some of said synchronized photosensitive elements being positioned in proximity thereby allowing electromagnetic crosstalk caused by an aggressor photosensitive element of said plurality to affect at least one victim photosensitive element of said plurality, the computer-implemented method comprising use of at least one processing unit for:

receiving a plurality of aggressor calibration traces from said aggressor photosensitive element and a plurality of victim calibration traces from said at least one victim photosensitive element, the aggressor calibration traces and the victim calibration traces being obtained in a controlled environment wherein an amplitude of a calibration peak of said aggressor calibration traces is varied and no object is present in a field-of-view of said at least one victim photosensitive element;

finding a mathematical representation of the electromagnetic crosstalk present in said plurality of victim calibration traces for each of said at least one victim photosensitive element using said aggressor calibration traces and said victim calibration traces;

determining a predetermined threshold for each of said at least one victim photosensitive element using said aggressor calibration traces and said victim calibration traces, said predetermined threshold corresponding to a minimum amplitude of said calibration peak of said aggressor calibration traces at which said electromagnetic crosstalk is present in said plurality of victim calibration traces;

receiving an operation trace from said aggressor photosensitive element, said operation trace being obtained in an uncontrolled environment wherein a shape of a detection peak of said operation trace is determined by a presence of an object in a field-of-view of said optical time-of-flight sensor during normal operation, said shape including an amplitude and a location of said detection peak;

comparing said amplitude of said detection peak of said operation trace to said predetermined threshold and identifying the operation trace as being an aggressor signal created by said aggressor photosensitive element if the amplitude of the detection peak is greater than said predetermined threshold;

receiving at least one synchronized victim operation trace from said at least one victim photosensitive element;

predicting the extrinsic static noise generated by the aggressor signal on said at least one synchronized victim operation trace using said mathematical representation for each of said at least one victim photosensitive element to generate a predicted crosstalk signal;

removing the predicted crosstalk signal from said synchronized victim operation trace, thereby obtaining at least one denoised signal; and outputting the at least one denoised signal.

2. The computer-implemented method of claim 1,
further comprising identifying the operation trace as being saturated; and
wherein said comparing said amplitude of said detection peak comprises interpolating a peak value of the operation trace identified as saturated.

3. The computer-implemented method of claim 2, wherein said interpolating the peak value is performed using a fourth-order polynomial equation.

4. The computer-implemented method of claim 1, wherein said mathematical representation is a difference equation, wherein coefficients of said difference equation describe a shape of said plurality of victim calibration traces with respect to said plurality of aggressor calibration traces for each of said at least one victim photosensitive element.

5. The computer-implemented method of claim 4, wherein said finding said mathematical representation includes:
determining a cost function for the difference equation;
calculating said coefficients by minimizing the cost function and the minimal value of the cost function; and
comparing the minimal value of the cost function to a cost threshold.

6. The computer-implemented method of claim 5, wherein said calculating the coefficients of the difference equation is performed using an optimization method.

7. The computer-implemented method of claim 6, wherein the optimization method comprises a Levenberg-Marquardt method.

8. The computer-implemented method of claim 5, further comprising, when the minimal value of the cost function is above the cost threshold, determining the mathematical representation using a template.

9. The computer-implemented method of claim 4, wherein the difference equation is a linear time-invariant discrete equation.

10. The computer-implemented method of claim 1, wherein said mathematical representation is a template, said template being weighted by said amplitude of said detection peak and aligned with a location of said detection peak.

11. A system for at least partially removing extrinsic static noise from full-waveform data obtained using an optical time-of-flight sensor having a plurality of synchronized photosensitive elements, at least some of said synchronized photosensitive elements being positioned in proximity thereby allowing electromagnetic crosstalk caused by an aggressor photosensitive element of said plurality to affect at least one victim photosensitive element of said plurality, the system comprising:
an identification and parameter estimation unit for
receiving a plurality of aggressor calibration traces from said aggressor photosensitive element and a plurality of victim calibration traces from said at least one victim photosensitive element, the aggressor calibration traces and the victim calibration traces being obtained in a controlled environment wherein an amplitude of a calibration peak of said aggressor calibration traces is varied and no object is present in a field-of-view of said at least one victim photosensitive element;
finding a mathematical representation of the electromagnetic crosstalk present in said plurality of victim calibration traces for each of said at least one victim photosensitive element using said aggressor calibration traces and said victim calibration traces;
determining a predetermined threshold for each of said at least one victim photosensitive element using said aggressor calibration traces and said victim calibration traces, said predetermined threshold corresponding to a minimum amplitude of said calibration peak of said aggressor calibration traces at which said electromagnetic crosstalk is present in said plurality of victim calibration traces;
a peak detection unit for
receiving an operation trace from said aggressor photosensitive element, said operation trace being obtained in an uncontrolled environment wherein a shape of a detection peak of said operation trace is determined by a presence of an object in a field-of-view of said optical time-of-flight sensor during normal operation, said shape including an amplitude and a location of said detection peak;
comparing said amplitude of said detection peak of said operation trace to said predetermined threshold and identifying the operation trace as being an aggressor signal created by said aggressor photosensitive element if the amplitude of the detection peak is greater than said predetermined threshold;
receiving at least one synchronized victim operation trace from said at least one victim photosensitive element;
a crosstalk prediction unit for
predicting the extrinsic static noise generated by the aggressor signal on said at least one synchronized victim operation trace using said mathematical representation for each of said at least one victim photosensitive element to generate a predicted crosstalk signal;
removing the predicted crosstalk signal from said synchronized victim operation trace, thereby obtaining at least one denoised signal; and
outputting the at least one denoised signal;
wherein said identification and parameter estimation unit, said peak detection unit and said crosstalk prediction unit are provided by at least one processing unit.

12. The system of claim 11, further comprising a saturated summit completion unit for identifying the operation trace as being saturated and interpolating a peak value of the operation trace identified as saturated.

13. The system of claim 11, wherein said mathematical representation is a difference equation, wherein coefficients of said difference equation describe a shape of said plurality of victim calibration traces with respect to said plurality of aggressor calibration traces for each of said at least one victim photosensitive element.

14. The system of claim 13, wherein the difference equation is a linear time-invariant discrete equation.

15. The system of claim 13, wherein said identification and parameter estimation unit is further for:
determining a cost function for the difference equation;
calculating said coefficients by minimizing the cost function and the minimal value of the cost function; and
comparing the minimal value of the cost function to a cost threshold.

16. The system of claim 15, wherein said identification and parameter estimation unit determines said mathematical representation using a template when the minimal value of the cost function is above the cost threshold.

17. The system of claim 11, wherein said identification and parameter estimation unit determines said mathematical representation using a template, said template being weighted by said amplitude of said detection peak and aligned with a location of said detection peak.

\* \* \* \* \*